United States Patent
Liska et al.

(10) Patent No.: US 10,982,071 B2
(45) Date of Patent: Apr. 20, 2021

(54) SULFONIC ACID ESTERS AS REGULATORS IN RADICAL POLYMERIZATION REACTIONS

(71) Applicants: IVOCLAR VIVADENT AG, Schaan (LI); TECHNISCHE UNIVERSITÄT WIEN, Vienna (AT)

(72) Inventors: Robert Liska, Schleinbach (AT); Christian Gorsche, Vienna (AT); Konstanze Seidler, Vienna (AT); Norbert Moszner, Mauren (LI)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 15/571,949

(22) PCT Filed: May 2, 2016

(86) PCT No.: PCT/EP2016/059787
§ 371 (c)(1),
(2) Date: Nov. 6, 2017

(87) PCT Pub. No.: WO2016/177677
PCT Pub. Date: Nov. 10, 2016

(65) Prior Publication Data
US 2018/0142082 A1    May 24, 2018

(30) Foreign Application Priority Data
May 7, 2015 (EP) .................... 15166848

(51) Int. Cl.
*C08K 5/42* (2006.01)
*C08F 2/38* (2006.01)
*C08L 57/00* (2006.01)

(52) U.S. Cl.
CPC .............. *C08K 5/42* (2013.01); *C08F 2/38* (2013.01); *C08L 57/00* (2013.01)

(58) Field of Classification Search
CPC .............. C08K 5/42; C08F 2/38; C08L 57/00
See application file for complete search history.

(56) References Cited

U.S. PATENT DOCUMENTS

| | | | |
|---|---|---|---|
| 2,694,699 A | * | 11/1954 | Laakso .......... C07C 309/65 204/157.78 |
| 5,932,675 A | | 8/1999 | Rizzardo et al. |
| 6,738,036 B2 | | 5/2004 | Janssen et al. |
| 2014/0329929 A1 | | 11/2014 | Moszner et al. |

FOREIGN PATENT DOCUMENTS

WO    2013034778 A2    3/2013

OTHER PUBLICATIONS

Elias H.-G., "Macromolecules : vol. 1: Chemical Structure and Synthesis," Ed. 6, Wiley-VCH, Weinheim, pp. 299-352 (1999).

Liska et al., "Biomaterials Based on Low Cytotoxic Vinyl Esters for Bone Replacement Application," J. Polym. Sci. A Polym. Chem., vol. 49, pp. 4927-4934 (2011).
Andreichikov et al., "Chemistry of oxalyl derivatives of methyl ketones," Zh. Org. Khim., vol. 13, 2070 (1997).
Moad, G. et al., "Radical addition—fragmentation chemistry in polymer synthesis," Polymer 49 (2008) 1079-1131; Australia.
International Preliminary Report on Patentability of PCT/EP2016/059787, dated Nov. 7, 2017, 7 pages.

* cited by examiner

Primary Examiner — Robert D Harlan
(74) Attorney, Agent, or Firm — Ann M. Knab; Thad McMurray

(57) ABSTRACT

The invention relates to the use of sulfonic acid esters of the following Formula 1 and/or Formula 2, individually or as a mixture of more than one thereof, as regulators in polymerization reactions of radically polymerizable, ethylenically unsaturated monomers:

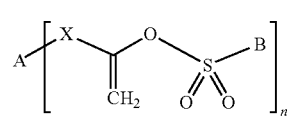

Formula 1

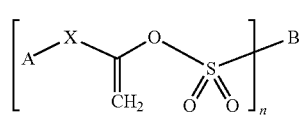

Formula 2 wherein
A in each case independently is selected from H, CN, linear, branched or cyclic aliphatic or aromatic $C_1$-$C_{30}$ hydrocarbon residues;
X in each case independently is —COO— or —CON($R^1$)—, wherein the binding to A occurs via O or N, or is absent if A is an aromatic hydrocarbon residue or CN;
B in each case independently is selected from linear, branched or cyclic aliphatic or aromatic $C_1$-$C_{30}$ hydrocarbon residues;
$R^1$ in each case independently is selected from hydrogen and linear, branched or cyclic aliphatic or aromatic $C_1$-$C_{10}$ hydrocarbon residues, which are optionally substituted with one or more OH groups, wherein the aliphatic hydrocarbon residues are optionally interrupted by one or more oxygen atoms; and
n in each case independently is an integer from 1 to 6.

21 Claims, 4 Drawing Sheets

C22  E13

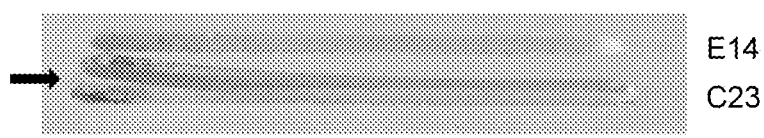
Fig. 2a
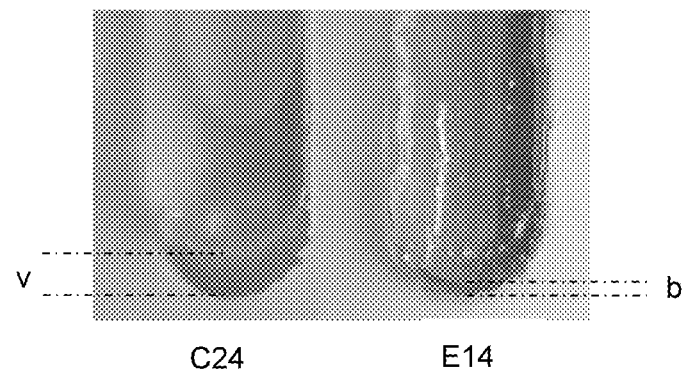
Fig. 2b
Figure 2

Fractured surface from comparison example 32

Fig. 4a: Fractured surface from Example 22

Fig. 4b: Fractured surface from Example 23

SULFONIC ACID ESTERS AS REGULATORS IN RADICAL POLYMERIZATION REACTIONS

The present invention relates to the use of sulfonic acid esters as regulators in radical polymerization reactions.

STATE OF THE ART

Radical polymers are formed by radical polymerization of one (homopolymer) or more (copolymer) radically polymerizable monomers. Depending on the functionality of the monomers being polymerized, linear polymers (in the case of monofunctional monomers) or cross-linked polymers (in the case of di- or multifunctional monomers) are obtained.

It is known that radical polymerizations can be performed in bulk (bulk polymerization), solution, suspension or emulsion. To trigger the polymerization, radical-forming initiators are added, which form radicals by thermolysis, photolysis or redox reaction. Radical polymerization proceeds according to a chain growth mechanism in which the polymerization-triggering radicals, the so-called primary radicals, are added on to the double bond of the monomers. The initiator radicals formed in this way add on to many other monomer molecules in a rapid growth reaction until the growth of the polymer radicals is terminated by combination or disproportionation and thus the finished macromolecules are formed.

In radical polymerization, chain transfers often occur. In this case, the polymer radical abstracts another atom from a second molecule, e.g. from a monomer, solvent or polymer molecule, by homolytic bond cleavage. The newly formed radical on the second molecule can again trigger a polymerization. By adding chain transfer agents, so-called regulators or chain regulators, the number average molar mass of the polymer can be regulated in a targeted manner (cf. H. G. Elias, Makromoleküle, vol. 1, 6th edition, Wiley-VCH, Weinheim etc. 199, 299-352). The known chain transfer agents include e.g. the mercaptans, which form thiyl radicals by the transfer of an H atom, which radicals then initiate a new polymerization sequence.

In addition, double-bond-containing reagents have proved particularly suitable as chain transfer agents, which react according to a radical addition-fragmentation chain transfer (AFCT) mechanism. Sulfur compounds, such as allyl sulfides, allyl sulfones, dithioesters, dithiocarbamates, xanthates and trithiocarbonates are particularly effective as AFCT reagents and have been well studied (Moad et al., Polymer 49, 1079-1131 (2008)). Furthermore, reversible AFCT reagents (RAFT reagents), such as e.g. dithioesters, dithiocarbamates, trithiocarbonates or xanthates, are known from controlled radical polymerization (Moad et al., see above; U.S. Pat. No. 5,932,675).

However, the use of the known compounds having transfer activity not only allows the molecular weight of the polymers to be controlled by chain termination in this way, but also undesirably retards the rate at which the polymerization progresses since it retards the chain reaction by temporarily stabilizing the radical.

U.S. Pat. No. 2,694,699 further discloses the homo- and copolymerization of a-sulfonoxy acrylates to give "high molecular weight resinous products". The optional addition of alkylmercaptans as chain regulators is also disclosed.

The inventors of the subject-matter of the present application have found in earlier works (cf. WO 2013/034778 A1 and the as yet unpublished EP 14 17 6730) that AFCT regulators similar to those described in Moad et al. (see above) are outstandingly suitable for use in dental materials, since they provide the polymers thus produced with debonding-on-demand properties, i.e. they make it possible to release adhesive bonds in a targeted manner (e.g. dental retaining clasps in orthodontics, so-called "brackets"). This is achieved by a more homogeneous network with a sharp glass transition, which is attributable to the regulating effect of the transfer reagent. The more homogeneous network also leads to a clear improvement in impact resistance, to a significantly greater extent than with the known materials. In addition, the gel point is shifted towards higher conversions during polymerization, leading to lower contraction stresses in the polymers.

However, these regulators have the disadvantage that they slow down the rates of polymerization, particularly in the polymerization of (meth)acrylates and vinyl esters, to too great an extent and therefore have an inhibiting effect on the chain growth of these monomers.

Against this background, the object of the invention was to provide chain transfer agents, i.e. regulators, which, while having a regulating effect on chain growth during the polymerization of radically polymerizable, ethylenically unsaturated monomers, do not slow down the rate of reaction to an undesirably great extent.

DISCLOSURE OF THE INVENTION

The invention achieves this object by providing the novel use of sulfonic acid esters of the following Formula 1 and/or Formula 2—some of which are known per se—individually or as a mixture of more than one thereof as regulators in polymerization reactions of radically polymerizable, ethylenically unsaturated monomers:

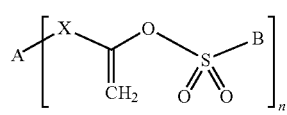

Formula 1

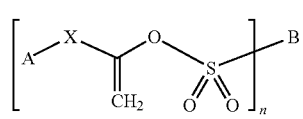

Formula 2 wherein
A in each case independently is selected from H, CN, linear, branched or cyclic aliphatic or aromatic $C_1$-$C_{30}$ hydrocarbon residues, which are optionally substituted with one or more substituents, wherein the aliphatic hydrocarbon residues are optionally interrupted by one or more urethane groups, ester groups, O and/or S;
X in each case independently is —COO— or —CON($R^1$)—, wherein the binding to A occurs via O or N, or is absent if A is an aromatic hydrocarbon residue or CN;
B in each case independently is selected from linear, branched or cyclic aliphatic or aromatic $C_1$-$C_{30}$ hydrocarbon residues, which are optionally substituted with one or more substituents, wherein the aliphatic hydrocarbon residues are optionally interrupted by one or more urethane groups, ester groups, O and/or S;
$R^1$ in each case independently is selected from hydrogen and linear, branched or cyclic aliphatic or aromatic $C_1$-$C_{10}$ hydrocarbon residues, which are optionally substituted with one or more OH groups, wherein the aliphatic hydrocarbon residues are optionally interrupted by one or more oxygen atoms; and n in each case independently is an integer from 1 to 6.

The inventors have surprisingly found that, by formally replacing the carbon atom in the sulfonylallyl groupings of the allyl sulfones and/or sulfonyl methyl acrylates known from Moad et al. (see above) with an oxygen atom, the suitability of the thus obtained vinylsulfonates or sulfonyloxy acrylates, acrylamides or acrylonitriles as regulators is significantly improved, particularly for the polymerization of (other) vinyl esters and (meth)acrylates.

The increased impact resistance and reduced contraction stress of the polymers noted by the inventors in earlier works with sulfonyl methacrylates are at least maintained by the use of the sulfonic acid esters as regulators according to the present invention, if not even further improved. At the same time, the gel point is also shifted into an advantageous range towards higher conversions, which leads to significantly lower contraction stresses. This means that, compared with the use of sulfonyl methacrylates, although the chain length and thus the molecular weight of the polymers is likewise controllably reduced compared with a polymerizable composition without regulators, the rate of the chain reaction is not reduced to such an extent that the regulator almost displays an inhibiting effect.

The molar ratio between the ethylenic unsaturations in the radically polymerizable monomers and the sulfonate groupings in the sulfonic acid esters of Formulae 1 and 2 acting as regulators is at least 2:1 according to the present invention and in preferred embodiments at least 3:1, more preferably at least 5:1 or at least 10:1, so that the chain lengths are not reduced excessively by the presence of the regulator. Based on the molecular weight, preferably 50 to 99 wt.-%, more preferably 60 to 98 wt.-%, more preferably 70 to 95 wt.-%, of the ethylenically unsaturated monomers are used, based on the total weight of the monomers and regulators, which depends on the one hand on the substituents A and B in Formula 1 and 2 and on the other hand on the monomers to be polymerized in each case. The solvent preferably used according to the present invention is particularly preferably selected from water, dimethyl sulfoxide, ethanol, dimethylformamide, polyethylene glycol, acetonitrile, THF, methylene chloride, chloroform, benzene and mixtures thereof in order to guarantee a homogeneous solution of the monomers and regulators without impeding chain growth.

Particularly preferably according to the present invention, the ethylenically unsaturated monomers are selected from (meth)acrylates, vinyl esters and mixtures thereof, more preferably from multifunctional (meth)acrylates and vinyl esters, since this is where the present invention—possibly because of the structural similarity of the vinylsulfonates of Formulae 1 and 2—has provided the best results so far.

If none of the substituents on the residues A or B is capable of initiating the radical polymerization, at least one radical polymerization initiator and optionally at least one solvent is used in the polymerization reaction, both of these being preferred, in order to achieve more precise control of the reaction conditions. Preferably 0.01 to 5 wt.-%, more preferably 0.1 to 5 wt.-%, in particular 0.1 to 3 wt.-%, based on the total weight of the monomers and regulators, of at least one radical polymerization initiator is used.

In preferred embodiments of the invention, the residue A is selected from hydrocarbon residues with 1 to 20, preferably 1 to 12, carbon atoms. Alternatively or in addition, residue A preferably comprises an aliphatic hydrocarbon residue, which is optionally interrupted by 1 to 4 urethane groups, ester groups or oxygen atoms, preferably oxygen atoms, and is optionally substituted with 1 to 4 OH groups.

The residues A and/or B preferably further comprise at least one phenyl, phenylene, naphthyl or naphthylene residue, preferably 1 to 4, more preferably 1 or 2, phenyl or phenylene residues, wherein the at least one phenyl, phenylene, naphthyl or naphthylene residue is more preferably substituted with 1 to 3 substituents selected from —OH, —CH$_3$ and —OCH$_3$.

The residues $R^1$, on the other hand, are preferably aliphatic $C_{1-6}$ hydrocarbon residues, which are optionally interrupted by 1 to 2 oxygen atoms and optionally substituted with 1 to 2 OH groups.

Furthermore, X is preferably either i) —COO—, in which case the binding to A occurs via O, i.e. the sulfonyloxy grouping in the sulfonic acid esters of Formula 1 or 2 is either bound in a position to the carboxyl group of an acrylate, or ii) X is absent, in which case A is an aromatic hydrocarbon residue with 6 carbon atoms, which is optionally substituted with 1 to 3 substituents selected from —CH$_3$, —OH and —OCH$_3$, with the result that the compounds of Formulae 1 and 2 each represent a vinylsulfonate substituted with A.

Furthermore, according to the present invention the parameter n is preferably 1 to 4, more preferably 1 to 2, in particular 2, by means of which the chain length of the polymers obtained can be controlled: in the case of n=2, the regulator acts as a linkage point between two growing polymer chains and therefore on average doubles the molecular weight of the chains, and in the case of n>2 the polymer chain branches at the point of the regulator in a star shape. However, more than 4 chain strands emanating from one point can be disadvantageous, particularly in terms of the production of cross-linked polymers, since in this way the cross-link density can be undesirably high.

In particularly preferred embodiments of the invention:

A for n=1 is selected from optionally branched $C_{1-10}$ alkyl, optionally interrupted by oxygen atoms, and phenyl, which in the case of n>1 can be substituted with further vinylsulfonate or sulfonyloxyacryloyloxy or sulfonyloxyacrylamido groupings;

B for n=1 is selected from OH, $C_{1-10}$ alkyl, phenyl and naphthyl, which are optionally substituted with OH, $C_{1-6}$ alkyl or alkoxy, benzyl or phenoxy and in the case of n>1 can be substituted with further vinyloxysulfonyl groupings; and $R^1$ is selected from $C_{1-10}$ alkyl.

Particularly preferred sulfonic acid esters of Formulae 1 and 2 are selected from the following:

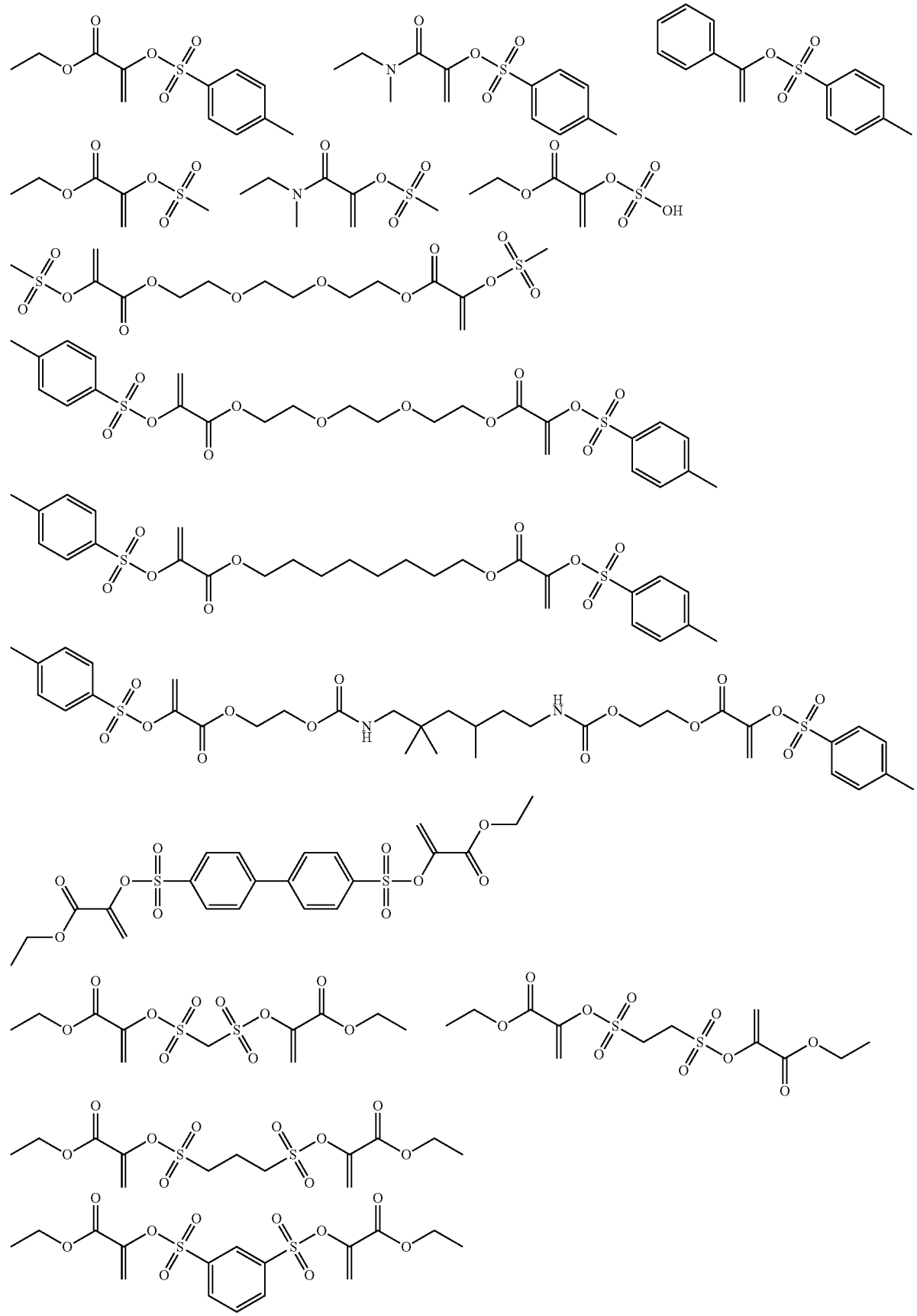

-continued

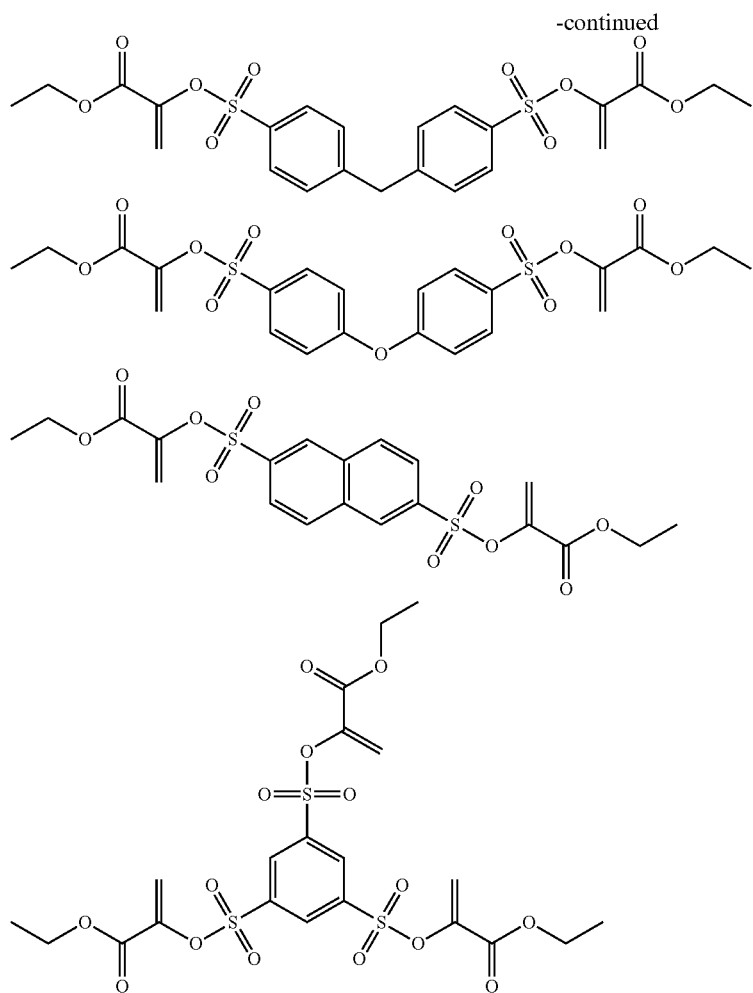

In a second aspect, the invention relates to a polymer that has been obtained by radical polymerization using sulfonic acid esters of Formula 1 and/or Formula 2 as defined above and which, owing to the presence of the regulator at the chain ends, exhibits a characteristic structure, as will be explained in more detail below. It is preferably a cross-linked polymer.

Such compositions produced according to the invention using sulfonic acid esters of Formula 1 and/or 2 and polymers obtained therefrom may be used advantageously for a variety of applications, and therefore in a third aspect the invention also relates to the use of these cross-linked polymers as varnishes, coatings or adhesives or for the production of shaped bodies by casting or 3D printing.

BRIEF DESCRIPTION OF THE DRAWINGS

The present invention is described below in more detail with reference to the attached drawings, which show the following:

FIGS. 2a and 2b each show a photo of a contraction test; and

DETAILED DESCRIPTION OF THE INVENTION

Figure 1:
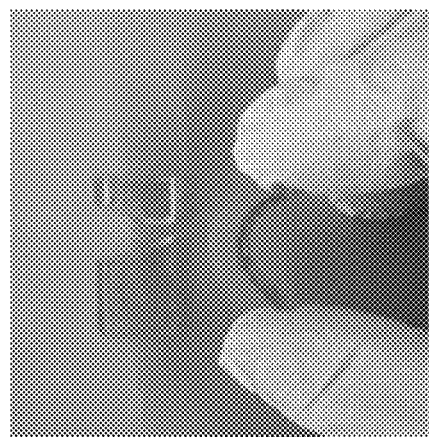
FIG. 1 shows a photo of a bending test with a polymer according to the invention.

Compounds of Formulae 1 and 2 are in some cases already known and can be produced by known synthesis methods. For example, by reacting pyruvic acid derivatives with sulfonyl halides under basic conditions, compounds of Formulae 1 and 2 having polymerization transfer activity are obtained:

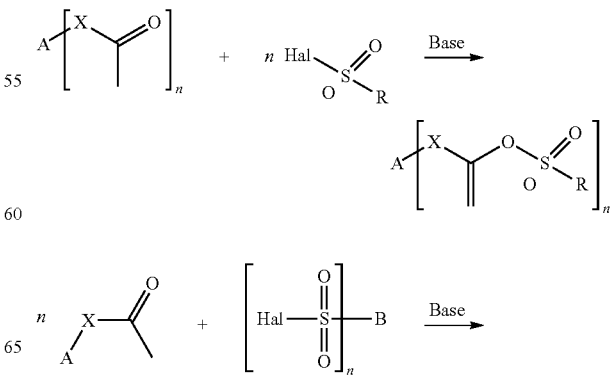

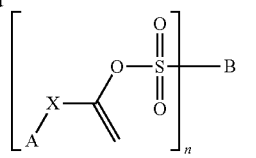
A specific example is:
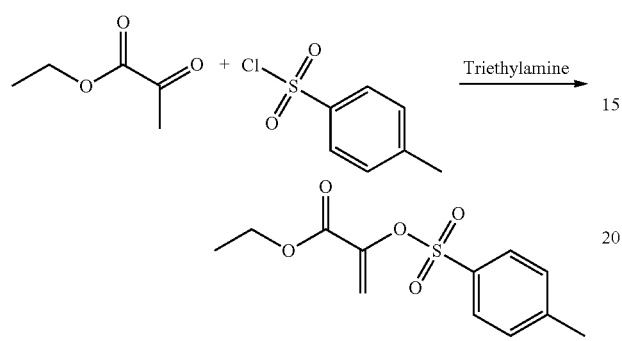
Exemplary examples of n=1, where Formula 1 and Formula 2 are identical, are the following compounds, which in some cases are also preferred for some applications:
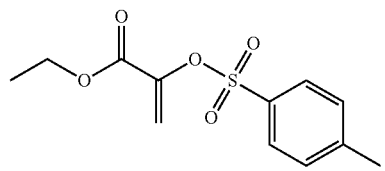
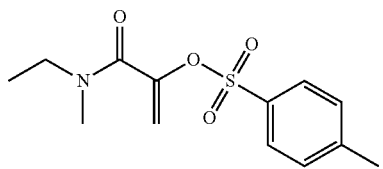
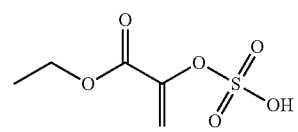
Preferred examples of compounds of Formula 1 with n=2 are the following:
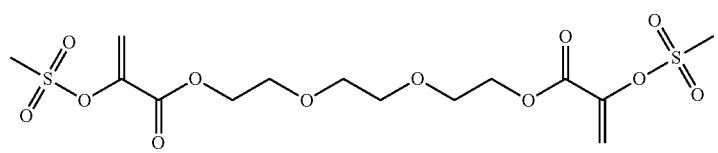
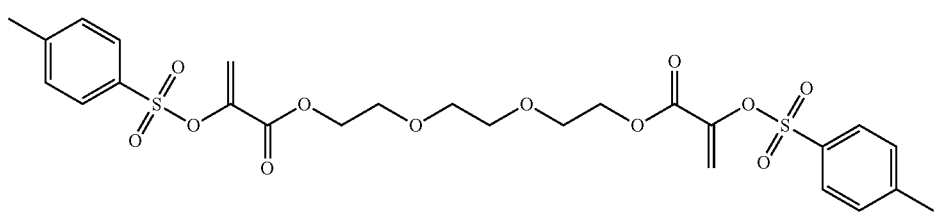
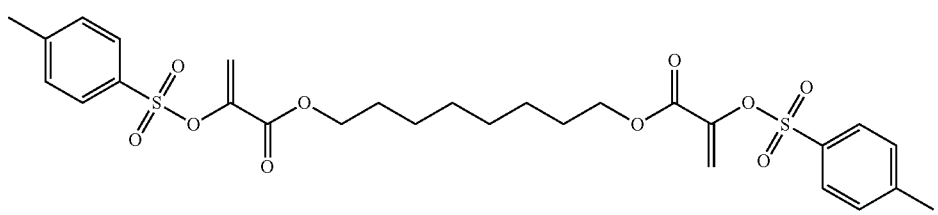

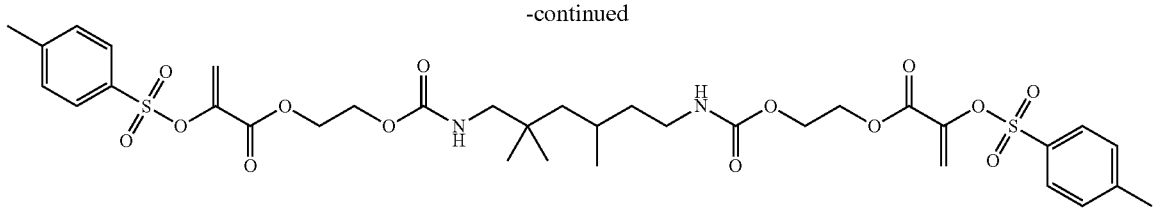

Preferred examples of compounds of Formula 2 with n=2 are the following:

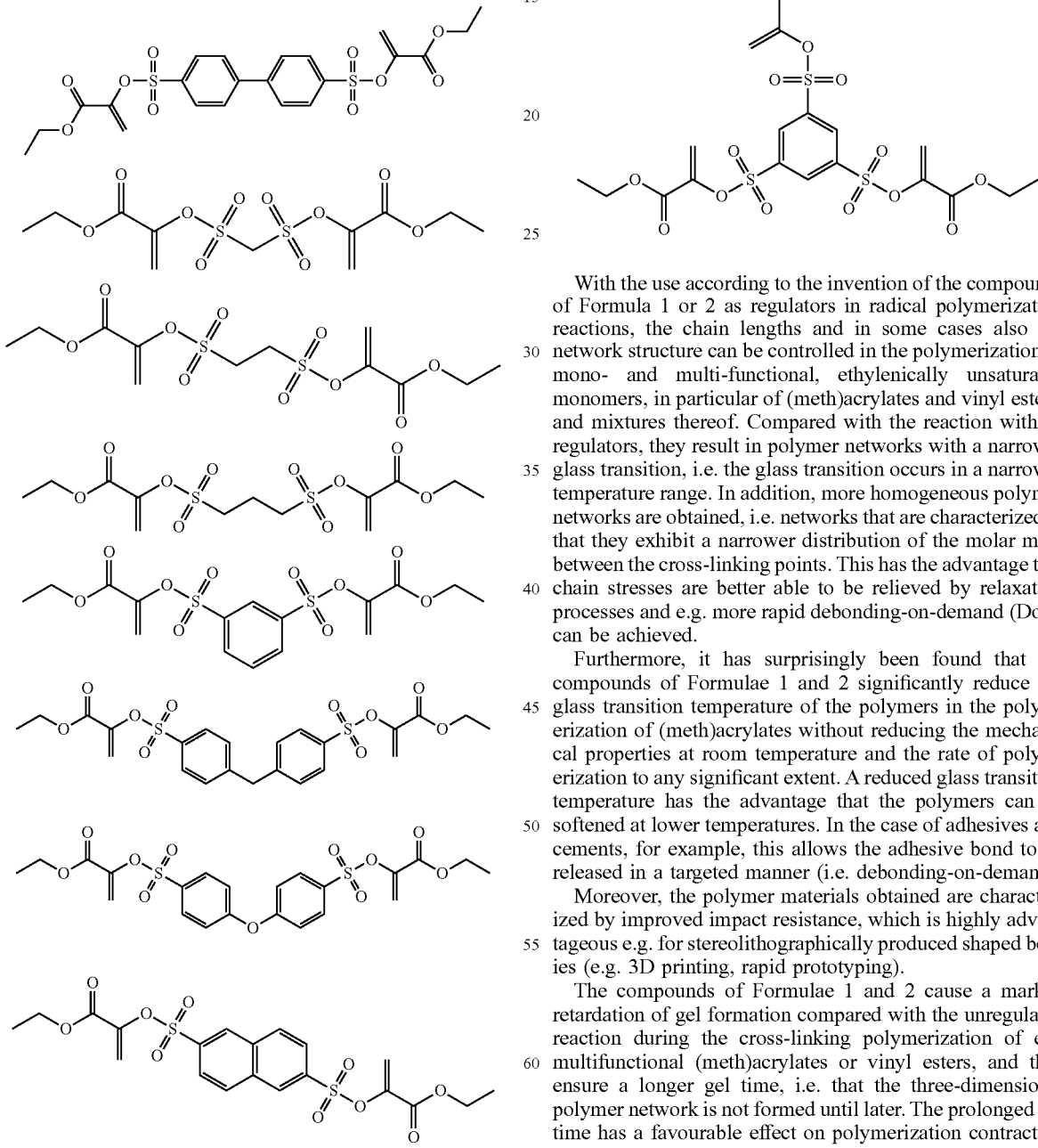

And a preferred example of compounds of Formula 2 with n=3 is:

With the use according to the invention of the compounds of Formula 1 or 2 as regulators in radical polymerization reactions, the chain lengths and in some cases also the network structure can be controlled in the polymerization of mono- and multi-functional, ethylenically unsaturated monomers, in particular of (meth)acrylates and vinyl esters, and mixtures thereof. Compared with the reaction without regulators, they result in polymer networks with a narrower glass transition, i.e. the glass transition occurs in a narrower temperature range. In addition, more homogeneous polymer networks are obtained, i.e. networks that are characterized in that they exhibit a narrower distribution of the molar mass between the cross-linking points. This has the advantage that chain stresses are better able to be relieved by relaxation processes and e.g. more rapid debonding-on-demand (DoD) can be achieved.

Furthermore, it has surprisingly been found that the compounds of Formulae 1 and 2 significantly reduce the glass transition temperature of the polymers in the polymerization of (meth)acrylates without reducing the mechanical properties at room temperature and the rate of polymerization to any significant extent. A reduced glass transition temperature has the advantage that the polymers can be softened at lower temperatures. In the case of adhesives and cements, for example, this allows the adhesive bond to be released in a targeted manner (i.e. debonding-on-demand).

Moreover, the polymer materials obtained are characterized by improved impact resistance, which is highly advantageous e.g. for stereolithographically produced shaped bodies (e.g. 3D printing, rapid prototyping).

The compounds of Formulae 1 and 2 cause a marked retardation of gel formation compared with the unregulated reaction during the cross-linking polymerization of e.g. multifunctional (meth)acrylates or vinyl esters, and thus ensure a longer gel time, i.e. that the three-dimensional polymer network is not formed until later. The prolonged gel time has a favourable effect on polymerization contraction stress (PCS), because a longer time is available for internal stresses to be compensated for by flow processes, which is highly advantageous in the case of complex geometries of shaped parts, for instance.

Surprisingly, however, the sulfonate esters according to the present invention do not retard the polymerization to anywhere near the same extent as was previously the case with the sulfonyl methyl acrylates or allyl sulfones known from Moat et al. (see above), as clearly demonstrated by the specific examples below.

Particularly preferred are embodiments in which at least one multifunctional monomer, more preferably at least one multifunctional (meth)acrylate or vinyl ester, in particular a mixture of mono- and multifunctional monomers, is used as radically polymerizable monomer. By monofunctional monomers is meant compounds with one, by polyfunctional monomers compounds with two or more, preferably 2 to 4, radically polymerizable ethylenic unsaturations.

In particular, the compositions according to the present invention comprise at least one dimethacrylate or a mixture of mono- and dimethacrylates. Materials containing mono- and multifunctional (meth)acrylates as radically polymerizable monomers are particularly suitable as adhesives, varnishes, printing inks and for 3D printing.

Examples of particularly suitable mono- and multifunctional (meth)acrylates are methyl, ethyl, 2-hydroxyethyl, butyl, benzyl, tetrahydrofurfuryl or isobornyl (meth)acrylate, p-cumylphenoxyethylene glycol methacrylate (CMP-1E), bisphenol A di(meth)acrylate, bis-G(M)A (an addition product of (meth)acrylic acid and bisphenol A diglycidyl ether), ethoxylated or propoxylated bisphenol A di(meth)acrylate, such as e.g. the bisphenol A dimethacrylate SR-348c (Sartomer) with 3 ethoxy groups or 2,2-bis[4-(2-(meth)acryloxypropoxy)phenyl]propane, UD(M)A (an addition product of 2-hydroxyethyl (meth)acrylate and 2,2,4- or 2,4,4-trimethylhexamethylene-1,6-diisocyanate), di-, tri- or tetraethylene glycol di(meth)acrylate, trimethylolpropane tri-(meth)acrylate, pentaerythritol tetra(meth)acrylate, and glycerol di- and tri(meth)acrylate, 1,4-butanediol di(meth)acrylate, 1,10-decanediol di(meth)acrylate ($D_3MA$), 1,12-dodecanediol di(meth)acrylate or oligomeric polyether, polyester, epoxy, silicone or urethane (meth)acrylates.

Also suitable are thermo- or photolabile di(meth)acrylates, such as e.g. the addition product of 2 mol 2-acetoacetoxyethyl methacrylate and 1 mol 2,2,4- or 2,4,4-trimethylhexamethylene-1,6-diisocyanate (thermolabile) or methacrylic acid 2-[2-(4-{2-methyl-2-[2-(methacryloyloxy)ethylcarbamoyloxy]propionyl}phenoxy)ethoxy-carbonylamino]ethyl ester. Mixture of thermo- or photolabile monomers and compounds of Formula 1 or 2 are particularly suitable for materials with debonding-on-demand properties.

To initiate radical photopolymerization, preferably benzophenone, benzoin and derivatives thereof or a-diketones or derivatives thereof, such as e.g. 9,10-phenanthrenequinone, 1-phenylpropane-1,2-dione, diacetyl or 4,4'-dichlorobenzil are used. Particularly preferably, camphorquinone (CQ) and 2,2-dimethoxy-2-phenylacetophenone and quite particularly preferably a-diketones combined with amines as reducing agents are used, such as e.g. 4-dimethylaminobenzoate (EDMAB), N,N-dimethylaminoethyl methacrylate, N,N-dimethyl-sym.-xylidine or triethanolamine. Norrish type-I photoinitiators are also highly suitable, especially acyl or bisacyl phosphine oxides and in particular monoacyltrialkyl- and/or diacyldialkyl-germanium compounds, such as e.g. benzoyltrimethylgermanium, dibenzoyldiethylgermanium or bis(4-methoxybenzoyl)diethylgermanium (MBDEGe). Mixtures of the different photoinitiators, such as e.g. bis(4-methoxybenzoyl)diethylgermanium combined with camphorquinone and ethyl 4-dimethylaminobenzoate, can also be used advantageously.

As initiators for heat curing, thermal initiators, such as for instance azo compounds, e.g. azobisisobutyronitrile, or peroxides, e.g. dibenzoyl peroxide, as well as benzopinacol and 2,2'-dialkylbenzopinacols are particularly suitable. As initiators for a polymerization carried out at room temperature, redox initiator combinations ("redox initiator"), such as e.g. combinations of benzoyl peroxide with N,N-dimethyl-sym.-xylidine or N,N-dimethyl-p-toluidine, are preferably used. In addition, redox systems consisting of peroxides and reducing agents of this type, such as e.g. ascorbic acid, barbiturates or sulfinic acids, are also particularly suitable.

According to a preferred embodiment of the invention, organic or inorganic particulate fillers, particularly preferably one or more inorganic particulate fillers, are additionally added during the polymerization. Mixtures containing monomers and fillers are referred to as composites.

Particularly suitable are fillers based on oxides with a particle size of 0.010 to 15 µm, such as $SiO_2$, $ZrO_2$ and $TiO_2$ or mixed oxides of $SiO_2$, $ZrO_2$, ZnO and/or $TiO_2$, nanoparticulate or microfine fillers with a particle size of 10 to 300 nm, such as pyrogenic silica or precipitated silica as well as glass powder with a particle size of 0.01 to 15 µm, preferably of 0.2 to 1.5 µm, such as quartz, glass-ceramic or radiopaque glass powders of e.g. barium- or strontium-aluminium silicate glasses, and radiopaque fillers with a particle size of 0.2 to 5 µm, such as ytterbium trifluoride, tantalum(V) oxide, barium sulfate or mixed oxides of $SiO_2$ with ytterbium(III) oxide or tantalum(V) oxide. Fibrous fillers, nanofibres or whiskers are also not excluded. Unless otherwise stated, all particle sizes are weight-average particle sizes.

The fillers are categorized as macrofillers or microfillers according to particle size. Macrofillers are obtained by grinding quartz, radiopaque glasses, borosilicates or ceramics, are purely inorganic by nature and generally consist of splinter-shaped parts. Preferred are macrofillers with an average particle size of 0.2 to 10 mm. As microfillers, preferably pyrogenic $SiO_2$ or precipitated silica is used, or mixed oxides, e.g. $SiO_2$—$ZrO_2$, which can be obtained by hydrolytic co-condensation of metal alkoxides. The microfillers preferably have an average particle size of approx. 5 to 100 nm.

To improve the bond between the filler particles and the cross-linked polymerization matrix, $SiO_2$-based fillers can be surface-modified with (meth)acrylate-functionalized silanes. An example of such silanes is 3-(meth)acryloyloxypropyltrimethoxysilane. For the surface modification of non-silicate fillers, e.g. of $ZrO_2$ or $TiO_2$, functionalized acidic phosphates, such as e.g. 10-(meth)acryloyloxydecyl dihydrogen phosphate, can also be used.

The degree of filling depends on the desired application. Filling composites preferably have a filler content of 75-90 wt.-% and composite cements 50-75 wt.-%.

The polymers according to the invention can in some preferred embodiments comprise e.g. 0 to 90 wt.-%, preferably 0 to 80 wt.-% and particularly preferably 0 to 70 wt.-% filler(s), based on the total weight of all components that are contained, wherein the filler content is adjusted according to the planned use of the polymers as described above.

The reaction mixtures may optionally also contain further additives, especially stabilizers, colorants, active microbicidal substances, blowing agents, optical brighteners, plasticizers or UV absorbers, e.g. in a quantity of 0 to 5 wt.-%, preferably 0 to 3 wt.-% and particularly preferably 0.2 to 3 wt.-%, based on the total weight of all components that are contained.

The polymers according to the invention, depending on the desired intended use, can advantageously also contain one or more solvents, preferably 0 to 80 wt.-%, particularly preferably 0 to 60 wt.-% and in particular 0 to 40 wt.-% solvent, based on the total weight of all components that are contained. Preferred solvents are water, ethanol, polyethylene glycol and mixtures thereof.

Particularly preferred are polymers that only contain components which are explicitly mentioned herein. Furthermore, polymers are preferred in which the individual components are each selected from the preferred and particularly preferred substances named herein. Moreover, polymers which, apart from the compounds of Formula 1 and 2, contain no other sulfur compounds and in particular no volatile mercaptans, i.e. compounds having a typical mercaptan odour, are particularly preferred.

The polymers produced according to the invention have similar mechanical properties (flexural strength and modulus of elasticity) to dimethacrylate-based materials, but are characterized by reduced polymerization contraction stress (PCS), improved impact resistance and low inherent odour.

However, because of the mainly used monomer(s), reaction mixtures of this type and the polymers produced therefrom are suitable for a large number of applications, such as e.g. as varnishes or coatings on various surfaces, e.g. as decorative coatings and protective coats on wood, paper, cardboard and in particular plastics, ceramics or metal. The low polymerization retardation in particular is advantageous here, while the toughness and thus the resistance of the coatings to external mechanical influences can be improved significantly. Furthermore, they can be used as adhesives for bonding a wide variety of materials, or for the production of shaped bodies by casting, compression moulding, rapid prototyping or 3D printing. In particular, the improved impact resistance now allows these materials to come up to the same level as common thermoplastics. In addition, the low retardation is essential in curing for 3D printing.

A particularly preferred application of the materials according to the invention is in the field of the 3D printing of ceramic powders by means of lithography-based methods. Here, the photopolymer produced according to the invention represents the sacrificial structure in the sintering process. The tendency to crack can be reduced by the more homogeneous network.

Another significant use of the materials according to the invention is in the field of tissue regeneration. By means of suitable selection of the composition, both hydrogels (e.g. from compositions with a low monomer content in water) or so-called "PEG gels" (i.e. with polyethylene glycol as solvent) and rigid elastic bodies (e.g. from solvent-free compositions with a high proportion of polyfunctional monomers) can be formed, which can be used e.g. as a tissue, cartilage or bone substitute. Furthermore, the polymers obtained in this way can be used as tissue supports, e.g. for heart valves, as a base material for shunts and stents and as adhesives and closures (e.g. patches) for tissue damage caused by injury or genetically. By rapid prototyping, complex structures, such as e.g. those of bones or pieces of bone, can be replicated rapidly, relatively inexpensively and with great dimensional accuracy. Particularly preferred for these applications are formulations based on vinyl esters, vinyl carbonates and vinyl carbamates as radically polymerizable monomers. Owing to their low toxicity, these are also suitable for curing in vivo after direct application thereof to damaged tissue. However, they can also be introduced into the body e.g. in an optionally biodegradable bag or similar, formed into the desired shape and then cured in vivo or ex vivo. A particular advantage of the formulations according to the invention can be seen here in the significantly improved toughness of the materials.

The invention is explained in more detail below on the basis of specific examples, which are to be understood as being illustrative of the present invention but not as a restriction.

EXAMPLES

Synthetic Example 1

Synthesis of 2-methanesulfonyloxyacrylic acid ethyl ester 1

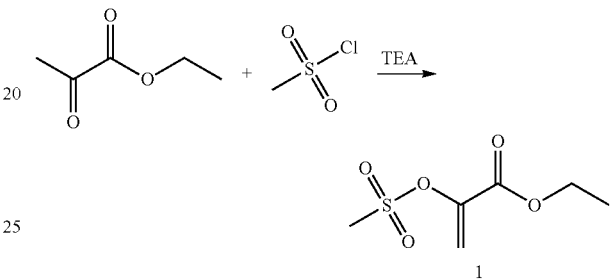

Triethylamine (TEA, 24.23 g, 0.24 mol) was added to a solution of ethyl pyruvate (23.22 g, 0.20 mol) in dichloromethane (200 ml) at −5° C. Methanesulfonyl chloride (27.49 g, 0.24 mol) was added dropwise. After this, the reaction mixture was stirred first for 1 h at −5° C. and then stirred further at ambient temperature. After 22 h the yellow reaction solution was washed with water (5×100 ml) and saturated aqueous NaCl solution (100 ml), dried over anhydrous $Na_2SO_4$, filtered and concentrated on a rotary evaporator. The crude product was purified by column chromatography ($SiO_2$, n-hexane/ethyl acetate 9:1), wherein 14.99 g (39% of theory) of 1 was obtained as a yellowish liquid.

$^1$H-NMR ($CDC_3$, 400 MHz): δ=1.35 (t, 3H; J=7.2 Hz; $CH_3$), 3.28 (s, 3H; S—$CH_3$), 4.31 (q, 2H; J=7.2 Hz; O—$CH_2$), 5.81 (d, 1H; J=2.3 Hz; =CH), 6.22 (d, 1H; J=2.3 Hz; =CH).

$^{13}$C-NMR ($CDCl_3$, 100.6 MHz): δ=13.9 ($CH_3$), 38.8 (S—$CH_3$), 62.2 (O—$CH_2$), 117.4 (=$CH_2$), 142.9 (=C), 161.0 (C=O).

IR (neat): 2986 (w), 2942 (w), 1731 (s), 1638 (m), 1468 (w), 1362 (s), 1334 (m), 1296 (s), 1187 (s), 1172 (m), 1136 (vs), 1019 (m), 956 (s), 895 (m), 861 (m), 790 (s), 684 (m), 627 (m) cm$^{-1}$.

Elemental analysis for $C_6H_{10}O_5S$: calculated C 37.11; H 5.19; S 16.51; found C 37.31; H 5.18; S 16.40.

Synthetic Example 2

Synthesis of 2-(toluene-4-sulfonyloxy)acrylic acid ethyl ester 2

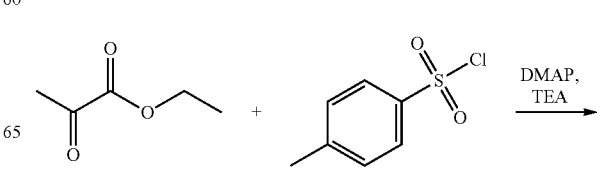

-continued

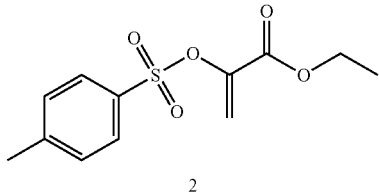 [SMILES: C=C(OS(=O)(=O)c1ccc(C)cc1)C(=O)OCC]

TEA (9.11 g, 90.0 mmol) was added dropwise to a solution of ethyl pyruvate (5.81 g, 50.0 mmol), p-toluene-sulfonyl chloride (11.44 g, 60.0 mmol) and N,N-dimethyl-aminopyridine (DMAP, 0.44 g, 3.6 mmol) in dichloromethane (100 ml). The reaction solution was stirred for 24 h at ambient temperature, washed with water (3×100 ml) and saturated aqueous NaCl solution (100 ml), dried over anhydrous $Na_2SO_4$, filtered and concentrated on a rotary evaporator. The crude product was purified by column chromatography ($SiO_2$, n-hexane/ethyl acetate 9:1), wherein 8.88 g (66% of theory) of 2 was obtained as a yellowish oil.

$^1$H-NMR ($CDCl_3$, 400 MHz): δ=1.22 (t, 3H; J=7.2 Hz; $CH_3$), 2.45 (s, 3H; Ar—$CH_3$), 4.15 (q, 2H; J=7.2 Hz; O—$CH_2$), 5.62 (d, 1H; J=2.1 Hz; =CH), 6.14 (d, 1H; J=2.4 Hz; =CH), 7.36 (d, 2H; J=8.2 Hz; Ar—H), 7.83 (d, 2H; J=8.4 Hz; Ar—H).

$^{13}$C-NMR ($CDCl_3$, 100.6 MHz): δ=13.8 ($CH_3$), 21.5 (Ar—$CH_3$), 61.9 (O—$CH_2$), 116.8 (=$CH_2$), 128.4 (Ar—CH), 129.6 (Ar—CH), 132.4 (Ar—C), 143.2 (=C), 145.5 (Ar—C), 160.7 (C=O).

IR (neat): 2984 (w), 1732 (s), 1639 (m), 1597 (m), 1494 (w), 1447 (w), 1372 (s), 1293 (s), 1194 (s), 1178 (s), 1140 (vs), 1090 (s), 1018 (m), 955 (s), 894 (m), 860 (m), 815 (m), 781 (m), 710 (s), 695 (s), 660 (s) $cm^{-1}$.

Elemental analysis for $C_{12}H_{14}O_5S$: calculated C 53.32; H 5.22; S 11.86; found C 53.49; H 5.23; S 11.57.

Synthetic Example 3

Synthesis of triethylene glycol bis[2-(toluene-4-sulfonyloxy)acrylate] 3

1st Stage: Triethylene Glycol Dipyruvate

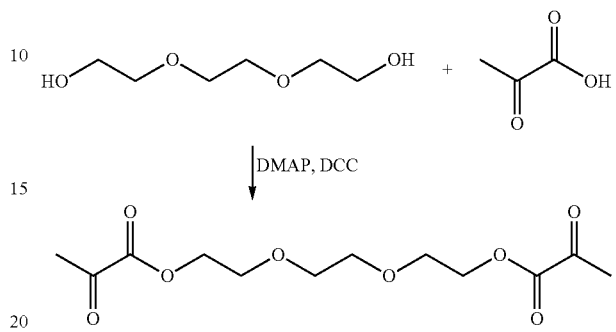

A solution of pyruvic acid (9.25 g, 0.105 mol), triethylene glycol (7.51 g, 50.0 mmol) and DMAP (0.60 g, 5.0 mmol) in dichloromethane (100 ml) was cooled to −5° C. N,N'=Dicyclohexylcarbodiimide (22.69 g, 0.11 mol) was added slowly. The reaction mixture was stirred for 2 h at 0° C. and then stirred further at RT. After 24 h the suspension was filtered through a layer of silica gel ($SiO_2$, ethyl acetate). The filtrate was concentrated on a rotary evaporator. The crude product was purified by column chromatography ($SiO_2$, n-hexane/ethyl acetate 1:1), wherein 6.08 g (42% of theory) of a yellow liquid was obtained.

$^1$H-NMR ($CDCl_3$, 400 MHz): δ=2.48 (s, 6H; $CH_3$), 3.67 (s, 4H; $CH_2$), 3.80 (m, 4H; $CH_2$), 4.40 (m, 4H; $CH_2$).

$^{13}$C-NMR ($CDCl_3$, 100.6 MHz): δ=26.4 ($CH_3$), 65.0 ($CH_2$), 68.2 ($CH_2$), 70.3 ($CH_2$), 160.4 (C=O), 191.3 (C=O).

IR (neat): 3452 (w), 2874 (w), 1727 (vs), 1450 (w), 1420 (w), 1358 (m), 1298 (s), 1123 (s), 1029 (m), 975 (m), 944 (m), 857 (m), 718 (m), 604 (m) $cm^{-1}$.

Elemental analysis for $C_{12}H_{18}O_8$: calculated C 49.65; H 6.25; found C 49.16; H 6.45.

2nd Stage: Triethylene glycol bis[2-(toluene-4-sulfonyloxy)acrylate] 3

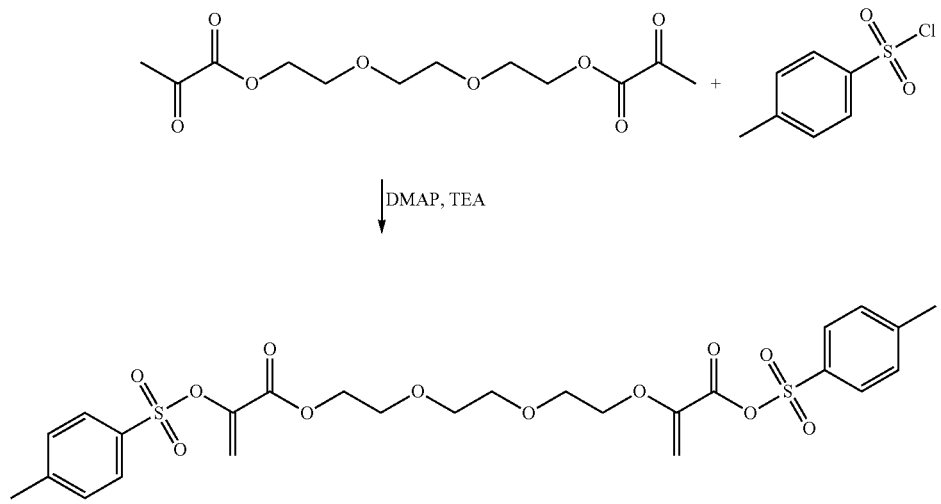

Triethylene glycol dipyruvate (5.81 g, 20.0 mmol), p-toluenesulfonyl chloride (9.53 g, 50.0 mmol) and N,N-dimethylaminopyridine (0.36 g, 3.0 mmol) were dissolved in dichloromethane (100 ml), and triethylamine (7.29 g, 72.0 mmol) was added dropwise. The reaction mixture was stirred for 24 h at RT, washed with water (3×100 ml) and saturated aqueous NaCl solution (100 ml), dried over $Na_2SO_4$, filtered and concentrated on a rotary evaporator. The brown oil was dissolved in n-hexane/ethyl acetate 1:1 (25 ml) and dichloromethane (5 ml) and filtered through a layer of silica gel ($SiO_2$, n-hexane/ethyl acetate 1:1). The filtrate was concentrated on a rotary evaporator. Diethyl ether (100 ml) was added to the brownish oil, wherein a brownish precipitate formed. This was filtered off, purified further by repeated digestion with diethyl ether and dried in a vacuum-drying cabinet, wherein 3.64 g (30% of theory) of 3 was obtained as a white solid.

MP: 94° C. ($Et_2O$)

$^1$H-NMR ($CDCl_3$, 400 MHz): δ=2.45 (s, 6H; Ar—$CH_3$), 3.65 (s, 4H; $CH_2$), 3.68 (m, 4H; $CH_2$), 4.26 (m, 4H; $CH_2$), 5.60 (d, 2H; J=2.2 Hz; =CH), 6.15 (d, 2H; J=2.2 Hz; =CH), 7.36 (d, 4H; J=8.1 Hz; Ar—H), 7.84 (d, 4H; J=8.2 Hz; Ar—H).

$^{13}$C-NMR ($CDCl_3$, 100.6 MHz): δ=21.6 ($CH_3$), 64.9 ($CH_2$), 68.5 ($CH_2$), 70.5 ($CH_2$), 117.1 (=$CH_2$), 128.5 (Ar—CH), 129.7 (Ar—CH), 132.3 (Ar—C), 142.9 (=C), 145.6 (Ar—C), 160.8 (C=O).

IR (neat): 3053 (w), 2958 (w), 2911 (w), 2865 (w), 1735 (s), 1636 (m), 1596 (m), 1495 (w), 1460 (m), 1372 (s), 1328 (w), 1301 (m), 1250 (w), 1192 (s), 1177 (s), 1147 (s), 1130 (vs), 1088 (s), 1051 (m), 1017 (m), 958 (s), 906 (w), 875 (m), 850 (m), 823 (m), 806 (m), 798 (m), 784 (s), 713 (s), 693 (s), 658 (s), 638 (m) $cm^{-1}$.

Elemental analysis for $C_{26}H_{30}O_{12}S_2$: calculated C 52.17; H 5.05; S 10.71; found C 51.93; H 5.45; S 10.70.

Synthetic Example 4

Synthesis of 2-(toluene-4-sulfonylmethyl)acrylic acid ethyl ester 4

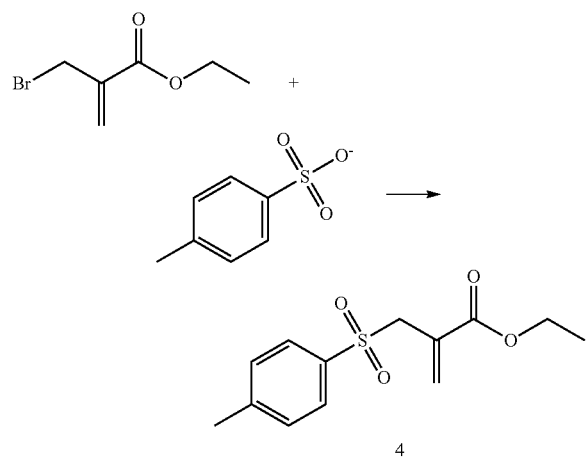

Ethyl 2-(bromomethyl)acrylate (1.13 g, 5.8 mmol), sodium p-toluenesulfonate (1.15 g, 6.4 mmol) and 0.12 g polyethylene oxide 400 were placed under an argon atmosphere in 10 ml abs. THF and heated under reflux for 5 h, wherein the progress of the reaction was monitored by NMR spectroscopy and thin layer chromatography. On completion of the reaction, the reaction solution was diluted with 10 ml deionized water and 10 ml diethyl ether, and the aqueous phase was extracted three times with 25 ml diethyl ether each time. The combined organic phases were then washed with sodium chloride solution, dried over sodium sulfate and concentrated on a rotary evaporator. The crude product that was obtained was purified by column chromatography ($SiO_2$, petroleum ether/ethyl acetate 1:1), wherein 1.35 g (5.0 mmol; 86% of theory) of 4 was obtained as white crystals.

Rf: 0.53 (PE/EE 1:1)

mp: 46.9° C.

$^1$H-NMR (200 MHz, $CDCl_3$, δ): 1.17 (t, J=7.2 Hz, 3H; —COO—$CH_2$—$\underline{CH_3}$), 2.43 (s, 3H; Ar—$CH_3$), 4.02 (q, J=7.2 Hz, 2H; —COO—$CH_2$—$CH_3$), 4.13 (s, 2H; —$SO_2$—$\underline{CH_2}$—C—), 5.89 (s, 1H; =$CH_2$), 6.49 (s, 1H; =$CH_2$), 7.32 (d, J=8.2 Hz, 2H; Ar—H), 7.73 (d, J=8.2 Hz, 2H; Ar—H).

$^{13}$C-NMR (50 MHz, $CDCl_3$, δ): 14.0 (C1), 21.6 (C1), 57.5 (C2), 61.4 (C2), 128.8 (C3), 129.2 (C4), 129.6 (C3), 133.2 (C2), 135.4 (C4), 144.8 (C4), 164.8 (C=O).

Synthetic Example 5

Synthesis of triethylene glycol bis[2-methanesulfonyloxy)acrylate] 5

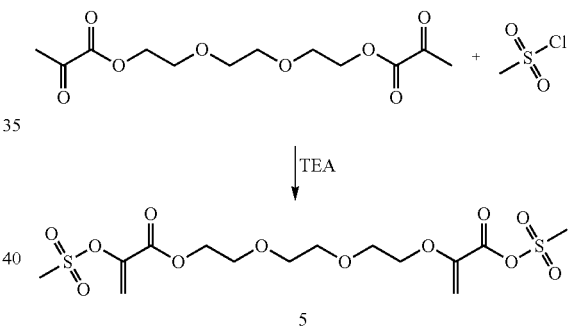

Triethylamine (15.69 g, 0.155 mol) was added to a solution of triethylene glycol dipyruvate (5.19 g, 17.9 mmol) in dichloromethane (100 ml) at −5° C., and methanesulfonyl chloride (17.76 g, 0.155 mol) was added dropwise. Next, the reaction mixture was stirred first for 1 h at −5° C. and then stirred further at ambient temperature. After 24 h the yellowish-brown reaction solution was washed with water (5×100 ml) and saturated aqueous NaCl solution (100 ml), dried over $Na_2SO_4$, filtered and concentrated on a rotary evaporator. The crude product was purified by column chromatography ($SiO_2$, n-hexane/acetone 3:2), wherein 1.69 g (3.8 mmol; 21% of theory) of 5 was obtained as a yellowish liquid.

Rf: 0.22 (n-hexane/acetone 3:2)

$^1$H-NMR ($CDCl_3$, 400 MHz): δ=3.28 (s, 6H; $CH_3$), 3.65 (s, 4H; $CH_2$), 3.75 (m, 4H; $CH_2$), 4.39 (m, 4H; $CH_2$), 5.83 (d, 2H; J=2.4 Hz; =CH), 6.26 (d, 2H; J=2.4 Hz; =CH).

$^{13}$C-NMR ($CDCl_3$, 100.6 MHz): δ=38.9 ($CH_3$), 65.1 ($CH_2$), 68.7 ($CH_2$), 70.5 ($CH_2$), 118.2 (=$CH_2$), 142.7 (=C), 161.1 (C=O).

IR (neat): 3025 (w), 2940 (w), 1732 (s), 1638 (m), 1454 (w), 1358 (s), 1294 (s), 1185 (s), 1135 (vs), 1031 (m), 954 (vs), 863 (m), 789 (s), 686 (s), 628 (m) $cm^{-1}$.

Synthetic Example 6

Synthesis of diethyl 2,2'([1,3-phenyldisulfonyl]bis[oxy])diacrylate 6

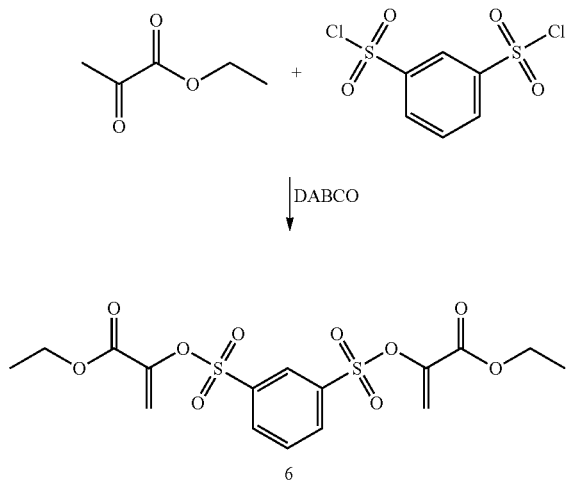

A solution of ethyl pyruvate (9.70 g, 83.5 mmol) and benzenedisulfonyl chloride (10.66 g, 116.3 mmol) in abs. $CH_2Cl_2$ (150 ml) was added dropwise to a solution of 1,4-diazabicyclo[2.2.2]octane (13.05 g, 38.8 mmol) in abs. $CH_2Cl_2$ (50 ml) under an argon atmosphere, accompanied by stirring. The reaction solution was stirred for 72 h at room temperature, diluted with $CH_2Cl_2$ (200 ml) and filtered through silica gel. The work-up took place by shaking out with 1% HCl (2×150 ml), deionized water (2×150 ml) and saturated aqueous NaCl solution (150 ml). The organic phase was dried over anhydrous $Na_2SO_4$, filtered and concentrated on a rotary evaporator, wherein 12.38 g (73% of theory) of (6) was obtained as a slightly viscous, yellowish liquid with an NMR purity of 98%.

Rf: 0.50 (PE/EE 2:1)

$^1$H-NMR (CDCl$_3$, 200 MHz): δ=8.46 (t, 1H, J=1.47 Hz, ar-2H), 8.21 (t, 2H, J=7.33 Hz, ar-4H, ar-6H) 7.77 (t, 1H, J=7.93, ar-5H), 6.16 (d, 2H, J=2.49 Hz, 2x>C=CH$_2$, cis), 5.69 (d, 2H, J=2.54 Hz, 2x>C=CH$_2$, trans), 4.09 (q, 4H, J=6.79 Hz, 2x O—CH$_2$—), 1.17 (t, 6H, J=7.14 Hz, 2x —CH$_3$).

$^{13}$C-NMR (CDCl$_3$, 50 MHz, δ): 181.9 (>C=), 160.4 (O—C=O), 143.0 (ar-S), 133.9 (ar-C4, ar-C6), 133.7 (ar-C5), 134.4 (ar-C2), 117.8 (=CH$_2$), 62.2 (O—CH$_2$—), 13.8 (—CH$_3$).

Examples 1 and 2, Comparison Examples 1 to 13

Reactivity Measurements

In order to compare the reactivity of the new compounds with known concepts, photo-DSC measurements were carried out with the mixtures that were produced. As an unmodified base resin, an equimolar mixture of the commercially available dimethacrylates urethane dimethacrylate (UDMA, mixture of isomers; CAS: 72869-86-4) and 1,10-decanediol dimethacrylate (D$_3$MA) (resin mixture 2M) was used to obtain cross-linked polymers. To this base mixture, 0.20 double bond equivalents of the respective regulator were then added. In the case of compounds with insufficient solubility, the proportion was reduced to 0.05 double bond equivalents (marked with * in Table 1).

For the polymerization, a Netzsch DSC 204 F1 with autosampler was used. The measurement was carried out isothermally at 25° C. under a nitrogen atmosphere. 10±1 mg of sample mixture were weighed into an aluminium DSC pan which was placed in the DSC chamber using the autosampler. The sample was flushed with nitrogen (20 ml/min) for 4 min and then irradiated for 5 min using filtered UV light (400-500 nm; Omnicure 2000) with an intensity of 1 W/cm$^2$ at the beam output of the lamp. The time taken to reach 95% of maximum conversion (t$_{95}$) and the time taken to reach the maximum rate of polymerization (t$_{max}$) were used to evaluate the reactivity.

Since, besides the rate of polymerization, the regulation of molecular weight is also crucial, samples were also produced with monofunctional benzyl methacrylate (BMA). The samples were also flushed with nitrogen (20 ml/min) for 4 min and then irradiated for 5 min using filtered UV light (400-500 nm; Omnicure 2000) with an intensity of 1 W/cm$^2$ at the beam output of the lamp. The polymerized samples were dissolved in THF and analysed with a Waters GPC with three columns connected in series (Styragel HR 0.5, Styragel HR 3 and Styragel HR 4) and a Waters 2410 RI detector in a column oven at 40° C. and at a flow rate of 1.0 ml/min. Polystyrene standards were used for calibration. The ratio between the number-average molecular weight of the modified polymer and that of pure poly-BMA (Mn$_{mod}$/Mn$_{BMA}$) shows how far the average molecular weight is reduced by the regulator. A marked reduction in molecular weight, i.e. a low value of the Mn$_{mod}$/Mn$_{BMA}$ ratio, is desirable together with a high rate of polymerization, i.e. relatively low values for t$_{95}$ and t$_{max}$ in the above reaction with UDMA/D$_3$MA. In addition, it is also desirable to achieve a high double bond conversion (DBC) in order to guarantee the necessary mechanical properties of the polymer. The double bond conversion for the UDMA/D$_3$MA monomer mixture is referred to below as DBC$_{U/D}$ and that for the BMA monomer alone as DBC$_{BMA}$.

As regulators here, compounds 1 and 2 according to the present invention were compared with, among others, those that were known from Moad et al. (see above) and from earlier research by the inventors, including compound 4, as well as other transfer reagents.

Comparison example 1 (C$_1$) involved either the pure methacrylate-based mixture of equal parts by weight of UDMA and D$_3$MA or monofunctional methacrylate BMA. Comparison example C2 is composed of a mixture of C1 and the β-allyl sulfone 4, which was used as an analogue to compound 2. C3 to C$_{12}$ are comparison examples from methacrylates (based on either UDMA/D$_3$MA or BMA) with a wide variety of known regulators, which are differentiated on the basis of their leaving group (sulfone, sulfide, phosphono, alkyl) or activating group (ester, amide, aromatic). C13 involves a formulation with a Barton ester as regulator.

TABLE 1
| Regulator | Example | $t_{95}$ [s] | $t_{max}$ [s] | $Mn_{mod}/Mn_{BMA}$ [] | $DBC_{UD}//DBC_{BMA}$ [%] // [%] |
|---|---|---|---|---|---|
| none (UDMA/D$_3$MA or BMA) | C1 | 66.4 | 4.3 | — | 74 // — |
| 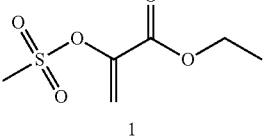 1 | E1 | 65.6 | 15.3 | 0.20 | 94 // 55 |
| 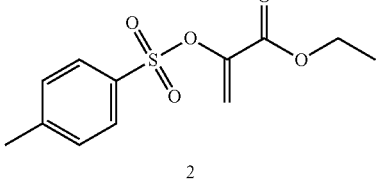 2 | E2 | 55.6 | 12.1 | 0.12 | 93 // 57 |
| 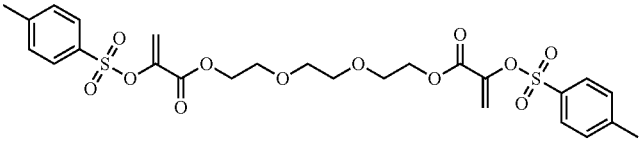 3 | E3 | 65.0 | 7.5 | 0.32 | 95 // 56 |
| 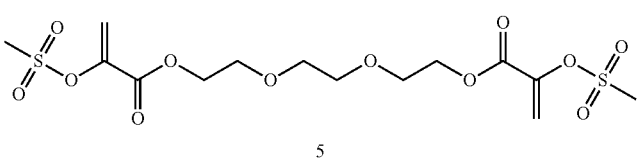 5 | E4 | 65.0 | 9.2 | 0.30 | 97 // 55 |
| 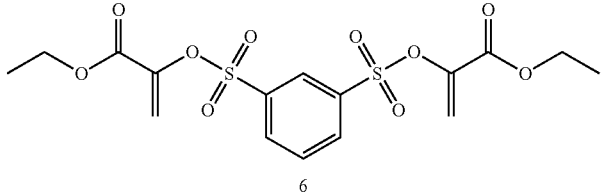 [SMILES: C=C(OS(=O)(=O)c1cccc(S(=O)(=O)OC(=C)C(=O)OCC)c1)C(=O)OCC] 6 | E5 | 44.3 | 7.8 | 0.22 | 93 // 82 |
| 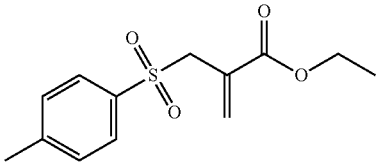 4 | C2 | 82.6 | 10.2 | 0.18 | 61 // 46 |
| 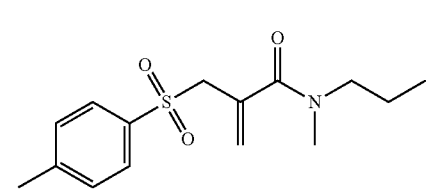 [SMILES: C=C(CS(=O)(=O)c1ccc(C)cc1)C(=O)N(C)CCC] | C3 | 33.2 | 5.1 | 1.16 | 86 // 76 |
| 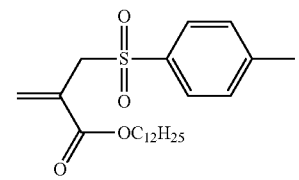 | C4 | 114.3 | 4.1 | 0.20 | 70 // 52 |

TABLE 1-continued
| Regulator | Example | $t_{95}$ [s] | $t_{max}$ [s] | $Mn_{mod}/Mn_{BMA}$ [] | $DBC_{U/D}$ // $DBC_{BMA}$ [%] // [%] |
|---|---|---|---|---|---|
| 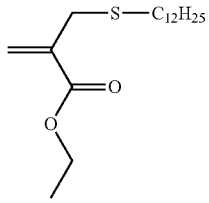 | C5 | 108 | 10.7 | 0.22 | 63 // 36 |
| 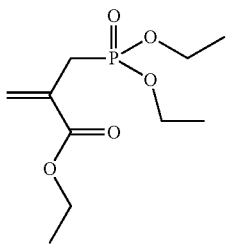 [SMILES: C=C(CP(=O)(OCC)OCC)C(=O)OCC] | C6 | 181.2 | 12 | 0.53 | 49 // 17 |
| 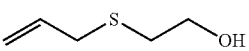 | C7 | 73 | 16.1 | 0.47 | — // 21 |
| 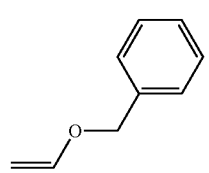 | C8 | 73.2 | 8.1 | 0.66 | — // 16 |
| 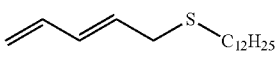 | C9 | 117.8 | 12.3 | 0.40 | — // 13 |
| 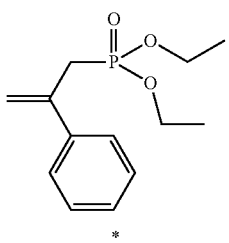 [SMILES: C=C(CP(=O)(OCC)OCC)c1ccccc1] | C10 | 107.8 | 9.9 | 0.49 | — // 15 |
| 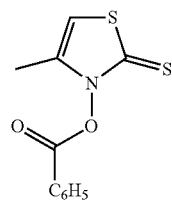 | C11 | 74.5 | 11 | 0.45 | 75 // 46 |
| 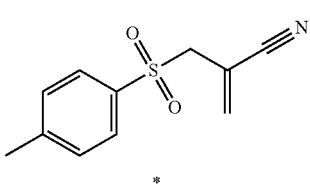 | C12 | 102.1 | 7.8 | 0.51 | 57 // 33 |

TABLE 1-continued

| Regulator | Example | $t_{95}$ [s] | $t_{max}$ [s] | $Mn_{mod}/Mn_{BMA}$ [] | $DBC_{UID}$ // $DBC_{BMA}$ [%] // [%] |
|---|---|---|---|---|---|
| 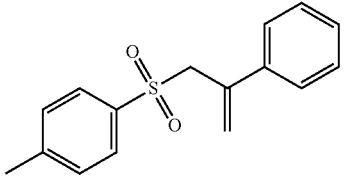 | C13 | 74 | 11.3 | 0.43 | 64 // 26 |

* low solubility, therefore c = 5 DB %

It is clear from Table 1 above that compounds 1, 2, 3, 5 and 6, when used according to the invention as regulators in Examples 1 to 5, were surprisingly able to shorten the time to taken to achieve 95% conversion, the only compound from the comparison examples to succeed in this being the compound from comparison example 3, an allyl sulfone. However, this compound increased the average molecular weight of the polymer obtained by as much as 16% instead of reducing the chain length. In contrast, the compounds according to the present invention brought about a significant reduction to up to about ⅛ of the unmodified product. At the same time, however, they caused an increase in the time $t_{max}$ taken to achieve the maximum rate of polymerization, in some cases to 3 to 4 times the value (Examples 1 and 2), which is advantageous as it means that gelation of the reaction mixture does not occur until much later, with the result that the polymerization can progress unimpeded for longer under substantially homogeneous conditions. Not one of the comparison examples displayed such a desirable combination of properties. Since compound 4 in comparison example 2, known from Moad et al. (see above), performed best in this respect, it was subsequently used for further comparisons with the sulfonic acid esters for the use according to the invention.

Examples 6 and 7, Comparison Examples 14 and 15

Production and Characterization of Photopolymers with Methacrylate Monomers

In the same way as in the above examples, resin formulations consisting of an equimolar mixture of UDMA and $D_3MA$ (comparison example 14) and the respective regulator were produced. Since in the previous examples compounds 1 and 2 had proved to be currently the best regulators according to the present invention, for the time being only these compounds were compared with the best comparison substance according to the state of the art, compound 4, in further tests. Thus, about 0.20 double bond equivalents of each of compounds 1 (Example 6), 2 (Example 7) and 4 (comparison example 15) were added to the above UDMA/$D_3MA$ base mixture. In addition, approx. 1 wt.-% MBDEGe was added to all the formulations as a photo-initiator. To check the photoreactivity, the formulations that were produced were measured with an MCR302 WESP photorheometer from Anton Paar, which was connected to a Bruker Vertex-80 IR spectrometer to monitor conversion. A PP-25 measuring system was used and the measuring gap was adjusted to 0.1 mm. Before and during curing (3 W/cm²; 320-500 nm; Omnicure 2000), the storage and loss modulus of the samples were measured in oscillation mode (1% deflection, 1 Hz). At the same time, IR spectra of the sample were recorded during the measurement at a frequency of approx. 5 Hz. The reaching of the gel point (intersection of storage and loss modulus) was used as a measure of the photoreactivity and again the time taken to achieve 95% of total conversion ($t_{95\%}$). In addition, the conversion at gel point ($DBC_g$), total conversion (DBC) and photopolymerization-induced contraction stress ($F_C$ or $F_{C(75\%)}$, i.e. $F_C$ at 75% conversion) were determined. The results obtained are compiled in Table 2

TABLE 2

RT-NIR photorheometry

| Example | Regulator | Gel point [s] | $DBC_g$ [%] | DBC [%] | $t_{95\%}$ [s] | $F_{C(75\%)}$ [N] | $F_C$ [N] |
|---|---|---|---|---|---|---|---|
| C14 | — | 2.1 | 41 | 79 | 69.0 | −14.9 | −17.9 |
| E6 | 1 | 10.4 | 46 | 95 | 48.2 | −9.9 | −19.5 |
| E7 | 2 | 7.9 | 56 | 93 | 25.9 | −8.8 | −15.6 |
| C15 | 4 | 12.4 | 38 | 76 | 110.5 | −9.7 | −12.0 |

It can be seen that the time taken to reach the gel point was extended by the addition of all three regulators. However, in the case of the use according to the invention of the sulfonic acid esters 1 and 2 in Examples 6 and 7, both the conversion at gel point and in particular the total conversion were increased over comparison example 14—indeed, the latter was increased considerably to more than 90%—while with the known regulator in comparison example 15 a slight decrease in conversion was even recorded. The 16 percentage point increase in total conversion in Example 6 results in a corresponding slight increase in the contraction stress of the polymer. However, a comparison of the contraction stresses at 75% conversion shows that all three regulators bring about a significant reduction in contraction stress at the same conversion. Furthermore, the time taken to reach 95% conversion is shortened significantly with the regulators according to the present invention, while it actually increases by more than 50% when compound 4 is used in comparison example 15. Thus, compounds 1 and (especially) 2 are superior to the comparison substance 4 in various respects.

Examples 8 and 9, Comparison Examples 16 and 17

DMTA Analysis of the Photopolymers Produced

To investigate the glass transition, formulations produced in the same way as in the above Examples 6 and 7 and comparison examples 14 and 15 were poured into silicone moulds and polymerized in a light furnace (Lumamat 100 model, Ivoclar AG) using programme 2 (10 min irradiation with an intensity of approx. 20 mW/cm$^2$). The bars were turned and cured again. The sample bars were polished and then measured using an Anton Paar MCR301 rheometer with a CTD (convection temperature control) oven and an inserted solid rectangular fixture (SRF12 for rectangular cross-sections of up to 12 mm). The rate of heating was set at 2° C./min. All the samples were heated up from −100° C. to 200° C. and oscillated at a constant frequency of 1 Hz and 0.1% deflection. Table 3 below gives the results for the determination of the storage modulus at room temperature ($G'_{(20°\,C.)}$), the glass transition temperature ($T_G$) and the full width at half maximum (FWHM) of the loss factor curve at glass transition.

TABLE 3

| | DMTA | | | |
|---|---|---|---|---|
| Example | Regulator | $G'_{(20°\,C.)}$ [MPa] | $T_G$ [° C.] | FWHM [° C.] |
| C16 | — | 940 | 150 | 146 |
| E8 | 1 | 999 | 69 | 23 |
| E9 | 2 | 1020 | 68 | 25 |
| C17 | 4 | 810 | 72 | 23 |

The measured values shown in Table 3 show that, by adding regulators, a lower and significantly narrower glass transition range was achieved. The effect of the three regulators is almost comparable from these points of view. With the use according to the invention of compounds 1 and 2 as regulators, the storage modulus at room temperature is (at least slightly) increased, however, while comparison compound 4 reduces it. In this respect too, therefore, the present invention gives better results than the state of the art.

Examples 10 and 11, Comparison Examples 18 and 19

Measurement of Impact Resistance (Dynstat Impact Test)

The toughness properties were determined using the DYNSTAT configuration according to DIN 53435, wherein the impact resistance (impact energy) of unnotched test pieces was determined in the impact bending configuration. To this end, test bars (1×0.45×0.15 cm) were made from formulations analogous to the above Examples 6 and 7 and comparison examples 14 and 15, and Dynstat impact tests were performed using a 5-kpcm hammer; 0.5 J). The values achieved are listed in Table 4 below.

TABLE 4

| Example | Compound | Impact energy [kJ/m$^2$][a] |
|---|---|---|
| C18 | — | 2.4 ± 0.4 |
| E10 | 1 | 11.3 ± 1.7 |
| E11 | 2 | 17.4 ± 1.1 |
| C19 | 4 | 6.1 ± 1.75 |

[a]Normalized to width and thickness

It can be seen that a significant increase in impact resistance was able to be achieved by all three regulators, with 4.7-fold and 7.25-fold increases being observed for compounds 1 and 2 in Examples 10 and 11 of the invention respectively, while comparison compound 4 only caused a 2.5-fold rise.

Example 12, Comparison Examples 20 and 21

Production and Characterization of Photopolymers with Divinyl Ester Monomer

Compound 2 as (currently) the best regulator according to the present invention was compared in this case with the best comparison substance according to the state of the art, compound 4, in the polymerization of a vinyl ester monomer, and specifically in the polymerization of glucitol divinyl adipate (GDVA):

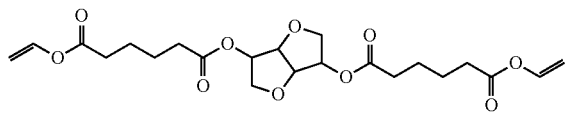

GDVA

To this end, formulations were produced with GDVA monomer alone (comparison example 20) and with 24 wt.-% of compounds 2 (Example 12) and 4 (comparison example 21) respectively. All three formulations additionally contained approx. 0.5 wt.-% Ivocerin (Ivoclar Vivadent) as photoinitiator. The photoreactivity was checked in the same way as in Examples 6 and 7 and comparison examples 14 and 15 above. Again, the time taken to reach the gel point (intersection of storage and loss modulus) and the time taken to reach 95% of total conversion ($t_{95\%}$) were used as a measure of photoreactivity. In addition, the conversion at gel point (DBCg), total conversion (DBC) and photopolymerization-induced contraction stress ($F_C$ and $F_{C(75\%)}$, i.e. $F_C$ at 75% conversion) were again determined. The results obtained are compiled in Table 5.

TABLE 5

| | RT-NIR photorheometry | | | | | |
|---|---|---|---|---|---|---|
| Example | Regulator | Gel point [s] | DBC$_g$ [%] | DBC [%] | $t_{95\%}$ [s] | $F_{C(75\%)}$ [N] | $F_C$ [N] |
| C20 | — | 2 | 13 | 76 | 66 | −12.7 | −20.5 |
| E12 | 2 | 26 | 45 | 75 | 165 | −4.4 | −10.0 |
| C21 | 4 | — | — | 21 | 59 | — | — |

As in the photopolymerization of di(meth)acrylates, rapid gelation occurred in the homopolymerization of the divinyl ester GDVA too, leading to high contraction stress of the polymer (−20.5 N) and low double bond conversions (approx. 76%) in the reaction without regulator in comparison example 20. It can clearly be seen that the photopolymerization of vinyl esters is inhibited by compound 4 in comparison example 21. The gel point could not be reached during the entire polymerization period (5 min) and the conversion was only approx. 21%. Without wishing to be bound by a particular theory, the inventors assume that the reason for this is the higher addition constant of radicals to the double bond of compound 4 compared with vinyl ester double bonds. With compound 2 in Example 12, on the other hand, the vinyl ester homopolymerization was able to be well regulated and a marked reduction in contraction stress was achieved with conversion remaining the same. This is probably attributable to the fact that the conversion at gel point (DBC$_g$) was already relatively high at 45% and the material was able to relax up to the gel point (contraction stress occurs only after the gel point has been reached).

Although the use according to the invention of compound 2 in vinyl ester polymerization also involves an extension of the overall reaction time (cf. $t_{95}$), this is compensated for by the significantly improved contraction stress.

Example 13, Comparison Example 22

Measurement of Impact Resistance (Dynstat Impact Test)

The toughness properties were determined in the same way as in Examples 10 and 11. In Table 6 below, the values obtained for formulations with GDVA monomer alone (comparison example 22) and with 24 wt.-% of compound 2 (Example 13) are listed.

TABLE 6

| Example | Regulator | Impact energy [kJ/m$^2$]$^{a)}$ |
|---------|-----------|-------------------------------|
| C22     | —         | 5.1 ± 1.0                     |
| E13     | 2         | —                             |

Only the test pieces made of pure GDVA could be broken with this test configuration while the test pieces produced according to the present invention with 24 wt.-% of compound 2 exhibited such high toughness that they withstood the impact bending test undamaged.

To interpret this result, the two photopolymers obtained were bent manually. Homopolymers of GDVA were very brittle and broke relatively easily, whereas polymers according to the invention with compound 2 could be bent without breaking, as illustrated in FIG. 1 for a polymer from comparison example 22 (left) and one from Example 13 (right).

Example 14, Comparison Examples 23 and 24

Production and Characterization of Gels with Polyethylene Glycol Diacrylate

Formulations were produced with polyethylene glycol diacrylate (PEGDA, Mw approx. 750 g/mol) alone (comparison example 23) and with 19 wt.-% of compounds 2 (Example 14) and 4 (comparison example 24) respectively. All the formulations additionally contained approx. 0.5 wt.-% Ivocerin as photoinitiator. The resin formulations produced were mixed with 60 wt.-% dimethyl sulfoxide (DMSO) and, to check the photoreactivity, these formulations were measured in the same way as in Example 6 with an MCR302 WESP photorheometer from Anton Paar, which was connected to a Bruker Vertex-80 IR spectrometer to monitor conversion. The results obtained are listed in Table 7.

TABLE 7

| | | RT-NIR photorheometry | | | |
|---------|-----------|-----------------|---------|-------|------|
| Example | Regulator | Gel point [s] | DBC$_g$ [%] | DBC [%] | Fc [N] |
| C23     | —         | 66              | >99     | >99   | −6.65 |
| E14     | 2         | 70              | 88      | >99   | −4.5  |
| C24     | 4         | 205             | 41      | 48    | −0.2  |

As in the photopolymerization of di(meth)acrylates without DMSO, rapid gelation occurred in the homopolymerization of PEGDA too, leading to high contraction stress (−6.6 N) in the reaction without regulator in comparison example 23 but also to almost complete conversions (>99%). It can clearly be seen that the photopolymerization of acrylate-based DMSO gels is also inhibited by compound 4. The gel point is only reached very late at >200 s and the conversion is very low at less than 50%, which also explains the very low contraction stress. Using compound 2, according to the present invention PEGDA polymerization in DMSO can be well regulated and greatly reduced contraction stress is obtained while maintaining high conversion.

The reduced contraction stress measured after adding compound 2 was illustrated in the following way: an optical analysis of the polymerization contraction was performed, to which end the DMSO-based PEGDA formulations with compound 2 as regulator were poured into a Teflon mould and irradiated in a Lumamat 100 for 10 min. FIG. 2 shows the gels obtained in this way.

In the two photos in FIG. 2 it can be seen that the gel from comparison example 23, which was produced without regulator, bends (FIG. 2a, bottom; indicated by the arrow) and the gel from comparison example 24, which was produced with compound 4, markedly shortens its length compared with the one from comparison example 23 (FIG. 2b, left; difference in length "v"). The gel from Example 14 produced according to the invention with compound 2 as regulator (FIG. 2a, top; FIG. 2b, right), on the other hand, hardly shrank as a result of the reduced contraction stress during polymerization (difference in length "b").

Example 15, Comparison Examples 25 and 26

Production and Characterization of Coatings with Urethane Diacrylate

Formulations were produced with the urethane diacrylate (UDA) Ebecryl 2002 from Sartomer alone (comparison example 25) and with 20 wt.-% of compounds 2 (Example 15) and 4 (comparison example 26) respectively. All the formulations additionally contained approx. 1 wt.-% Darocur 1173 (BASF) as photoinitiator. To check the photoreactivity these formulations were measured in the same way as in Examples 6 and 7 with an MCR302 WESP photorheometer from Anton Paar, which was connected to a Bruker Vertex-80 IR spectrometer to monitor conversion. The results obtained are listed in Table 8.

TABLE 8

| | | RT-NIR photorheometry | | |
|---------|-----------|------------|---------|------|
| Example | Regulator | $t_{95}$ [s] | DBC [%] | Fc [N] |
| C25     | —         | 69         | 96      | −7.6 |
| E15     | 2         | 116        | 99      | −0.2 |
| C26     | 4         | 185        | 73      | −5.2 |

It can be seen from Table 8 that, compared with the product from comparison example 25 produced without regulator, the polymer according to the invention from Example 15 was even able to increase the already high conversion still further, but above all it exhibited almost no contraction. With compound 4 as regulator in comparison example 26 the conversion was significantly lower than without regulator, and the contraction could be reduced only slightly. In addition, compared with compound 2 in the example according to the invention, compound 4 increased the reaction time considerably, i.e. by 2.7 times that of the polymerization without regulator, while in Example 15 it increased only 1.7-fold.

Examples 16 and 17, Comparison Examples 27 to 29

Cross-cut Test of Coatings in Accordance with DIN EN ISO 2409

An anodized aluminium foil was coated with formulations produced in the same way as in the above examples with UDA as monomer and 10 and 20 wt.-% regulator, respectively (4-mil doctor blade, approx. 102 µm) and cured in a UV oven. The coatings were cut using a cross-cut tester (6×2 mm) and then adhesive tape (Tesafilm Standard 19 mm) was stuck evenly over the cut coatings. The adhesive tapes were pulled off evenly at an angle of approx. 60° and the appearance of the remaining grid was evaluated. Table 9 shows the results obtained from this test.

TABLE 9

| Cross-cut test | | | |
|---|---|---|---|
| Example | Regulator | Quantity | ISO Rating |
| C27 | — | — | GT 3 |
| E16 | 2 | 10 wt.-% | GT 1 |
| E17 | 2 | 20 wt.-% | GT 1 |
| C28 | 4 | 10 wt.-% | GT 1 |
| C29 | 4 | 20 wt.-% | GT 1 |

The UDA-based coating without regulator from comparison example 27 exhibited a number of detached squares, whereas for all the coatings produced with regulator—both with 10 wt.-% and with 20 wt.-% regulator—only small flakes of the coating were detached at the intersections and cut edges of the grid lines. The effect of compounds 2 and 4 as regulator was equivalent in this respect.

Example 18, Comparison Example 30

Homo- and Copolymerization Tests with Compound 2

An investigation was carried out to see whether a homopolymerization of compounds of Formulae 1 and 2 is possible via sulfonyl radicals, as described by U.S. Pat. No. 2,694,699 cited at the beginning in its Examples 3 to 5 for three different a-sulfonoxy acrylates (to form allegedly "high molecular weight resinous products").

To this end, polymerization tests of compound 2 with 1 wt.-% Ivocerin® as photo-initiator (comparison example 30) and of benzyl methacrylate (BMA) with 28 wt.-% (20 mole %) of compound 2 and likewise 1 wt.-% Ivocerin® as photoinitiator (Example 18) were carried out using photo-DSC (5 min filtered UV light, 400-500 nm, Omnicure 2000) and the associated NMR spectra were evaluated.

Diagram 1 below shows the reaction sequence for the reaction without BMA in comparison example 30 confirmed by NMR.

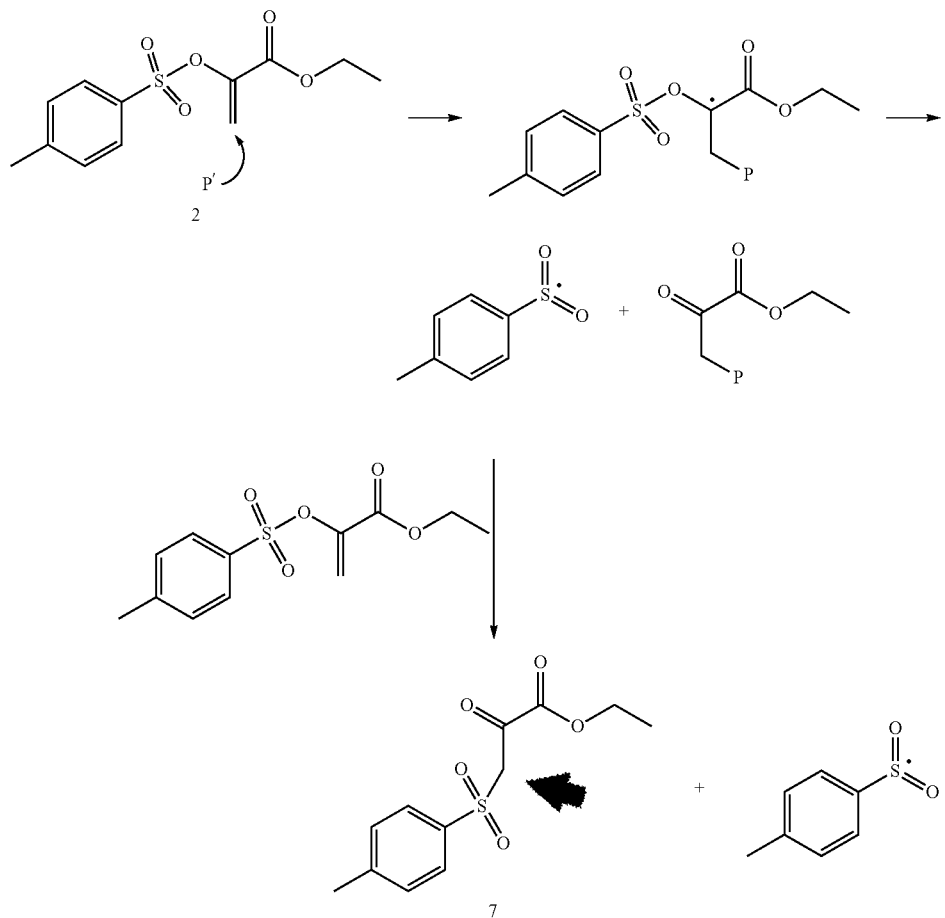

Diagram 1

Thus, after initiation by means of an initiator radical P■ fragmentation of the regulator molecule occurs, giving a tosyl radical and a pyruvate substituted with the initiator residue. However, the tosyl radical likewise initiates not a homopolymerization of the vinyl group of the vinylsulfonate grouping of compound 2 but another fragmentation, to form a substituted pyruvate and a further tosyl radical. The main product of the reaction is therefore the tosylated ethyl pyruvate 7 and not a polymer at all, let alone a "high molecular weight resinous product" as asserted in U.S. Pat. No. 2,694,699.

Sulfonate ester compounds of Formulae 1 and 2 are therefore incapable of any homopolymerization, since their vinylic or acrylic double bond does not enter into a chain growth reaction, but a fragmentation of the molecule already takes place beforehand with homolytic cleavage of the S—O bond resulting in a shift of the radical position from C to S.

For the methylene group of 7 indicated with an arrow, a chemical shift of δ=4.48 ppm is found in the literature (Andreichikov et al., Zh. Org. Khim. 13, 2070 (1977)), which could also be seen clearly in the $^1$H-NMR spectrum of the product from comparison example 26. The presence of about 99% of compound 7 in the reaction product was confirmed using an integral.

When an ethylenically polymerizable monomer such as benzyl methacrylate (BMA) is added, on the other hand, a chain growth reaction of the acrylic vinyl group does indeed occur according to Diagram 2 below.

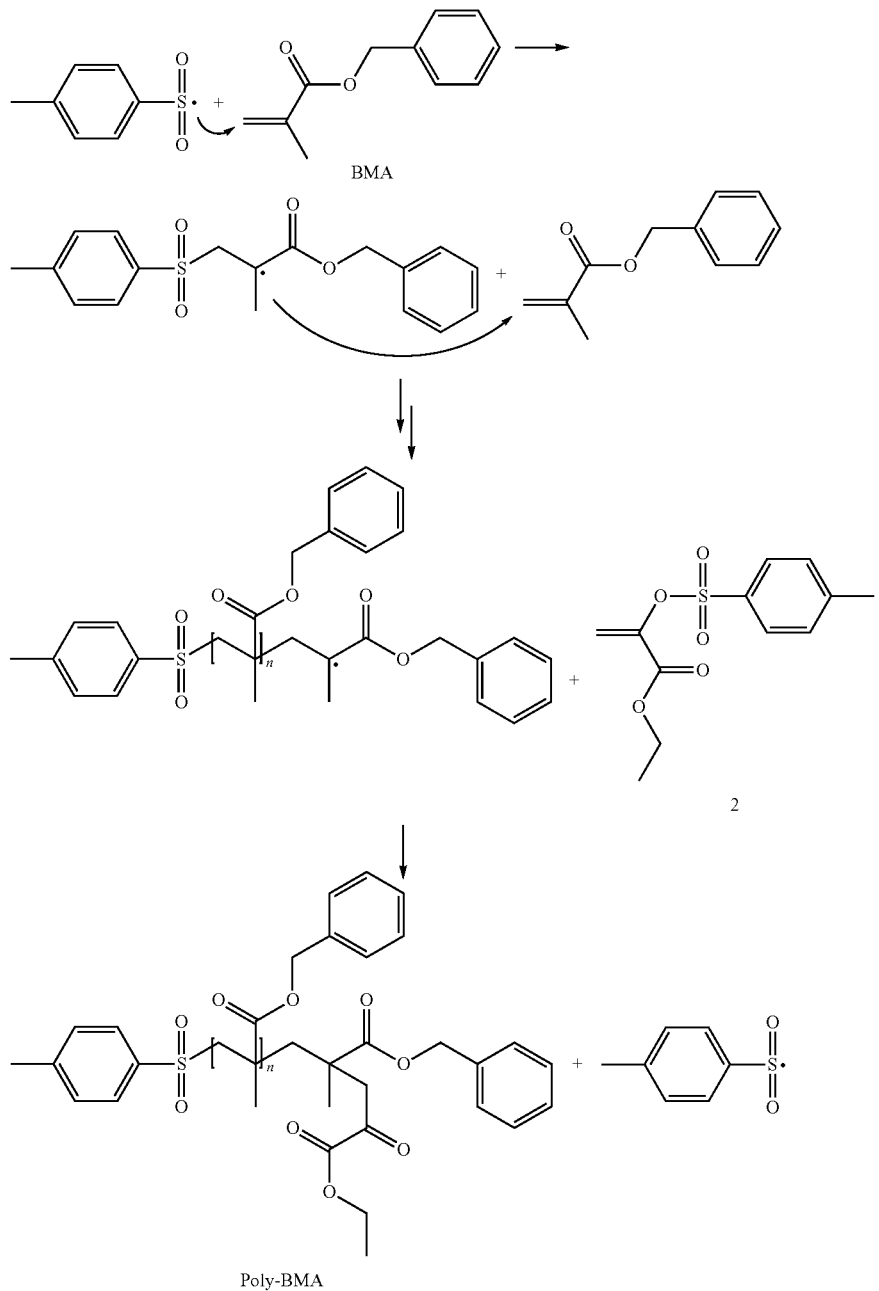

Diagram 2

The fragmented regulator molecule on the one hand therefore initiates the chain growth of the acrylate monomers, but also terminates it by means of a transfer reaction. The weight-average molecular weight of the polymer obtained in Example 18 in this test was about 1500 g/mol, corresponding to a value for n in the above diagram of about 6. This value can of course be controlled by a suitable selection of the quantitative ratios.

Here too, the vinyl group of the regulator 2 does not participate in the chain growth reaction of the acrylate monomers, but is in turn converted into a keto group in the course of the fragmentation of the molecule, wherein one fragment of the regulator molecule terminates the chain and the other (the sulfonyl radical) produces another growing chain by addition to a BMA molecule.

In the copolymerization tests disclosed in U.S. Pat. No. 2,694,699 (cf. Examples 7 to 9 therein)—in contrast to the present invention—the sulfonoxy acrylate is intended to act not as a regulator, but (allegedly) as a comonomer, which is why in all three examples it was used in molar ratios of sulfonoxy acrylate (ethyl α-benzenesulfonoxy acrylate or ethyl α-methanesulfonoxy acrylate, i.e. compound 1) to actual monomer (methyl acrylate, methyl methacrylate, styrene, acrylonitrile) of about 1:1.

The products obtained here, according to the reaction mechanism explained herein, can only be individual monomers terminated with the respective sulfonoxy acrylate, i.e. "surrounded" thereby, or at best extremely short-chain oligomers with an n of 0 to 2 in Diagram 2 above. However, the characterization and "clarification" of the structure could only take place by means of elemental analyses before the filing date of the associated patent application in 1952, since on the one hand NMR spectrometers were still completely uncommon and on the other hand gel permeation chromatography and accurate mass spectrometry methods for organic compounds using soft ionization (FT-ICR-, CI-, ESI- or MALDI-MS) had not yet even been invented. However, the data given in the US patent for the molar and weight ratios in the products of Examples 7 to 9 of the US patent, calculated from the elemental analyses, confirm the findings of the inventors of the subject-matter of the present application.

At the time, it was obviously not recognized that the sulfonoxy acrylates disclosed in the US patent are excellent polymerization regulators, which are therefore de facto unsuitable for actual copolymerization, however. Because of the molar ratio of about 1:1 that was used throughout, it was indeed impossible for this fact to be recognized in 1952, since there was no reliable method for determining the molecular weight of organic molecules.

Examples 19 to 21, Comparison Example 31

3D Printing

For 3D printing, reaction mixtures based on an aliphatic polyester urethane methacrylate (Bomar XR 741) with 1 wt.-% Ivocerin® as photoinitiator were produced. As regulators, 5, 7 and 10 wt.-% of compound 2 were added. In accordance with a specification from the literature (Liska et al., J. Polym. Sci. A Polym. Chem. 49, 4927-4934 (2011)), test bars of type 5B according to DIN EN ISO 527-2 were then printed and tensile tests were carried out using a Zwick-500 tensile testing machine. The results given in Table 10 each represent averages of at least 6 measurements.

TABLE 10

Elongation at break of 3D prints

| Example | Regulator | Quantity [wt.-%] | Elongation at break [%] |
|---------|-----------|------------------|-------------------------|
| C31     | —         | —                | 5.01                    |
| E19     | 2         | 5                | 7.12                    |
| E20     | 2         | 7                | 8.78                    |
| E21     | 2         | 9                | 12.32                   |

It can be seen clearly that the elongation at break was improved continuously by the addition according to the invention of regulator 2 in increasing quantities.

Examples 22 and 23, Comparison Example 32

Surface Investigations

Mixtures of monomers (resin mixture 2M) were produced in the same way as in Examples 1 and 2 without regulator (comparison example 32) and with 20 wt.-% of compound 1 (Example 22) and 26 wt.-% of compound 2 (Example 23). To obtain the micrograph, the formulations that had been produced were poured into silicone moulds and polymerized in a light furnace (Lumamat 100 model, Ivoclar AG) using programme 2 (P2: 10 min irradiation with an intensity of approx. 20 mW/cm$^2$). The bars (approx. 1×0.45×0.15 cm) were turned and again cured according to P2. The test bars were polished and then tested using a DYNSTAT configuration according to DIN 53435, wherein the test pieces were unnotched, using a 5 kpcm hammer as in Examples 3 and 4. The fractured surfaces were then analysed by means of SEM using an XL-30 SEM from Philips. For this, the samples were fixed on a sample holder with tape and the edges were coated with a conductive silver solution. The samples were then sputtered with a thin conductive gold layer. Images of the fractured surfaces were captured in 500× magnification.

Figure 3:
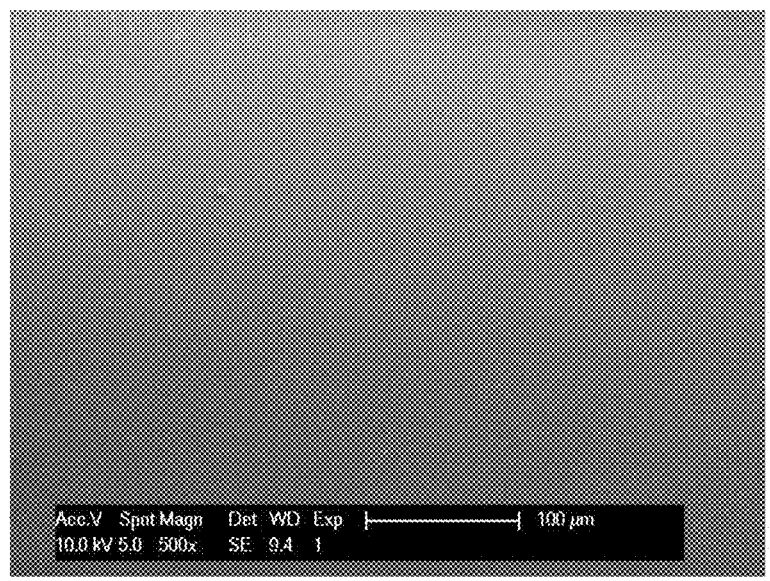
FIGS. 3, 4a and 4b each show a photo of the fractured surface of a polymer.

FIG. 3 shows the fractured surface of the polymer from comparison example 32, which had been produced without adding any regulator: an extremely smooth fractured surface, which therefore indicates a brittle fracture.

Figure 4:
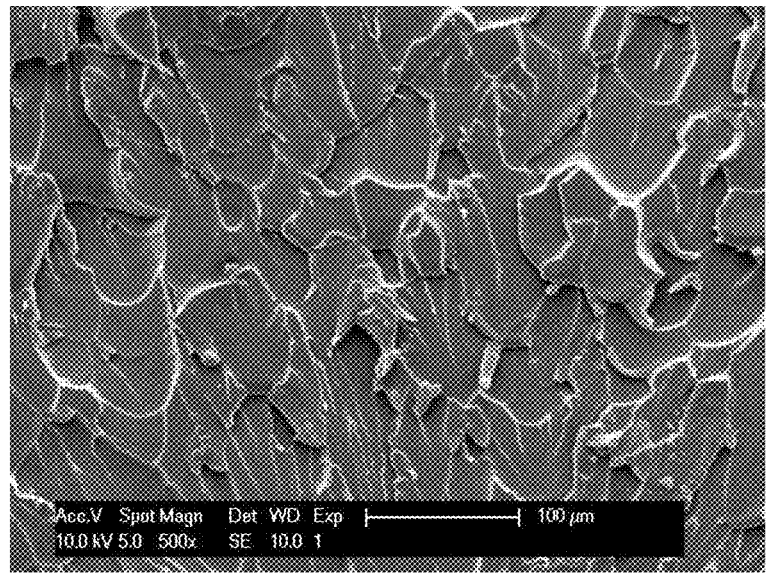
Figure 4:
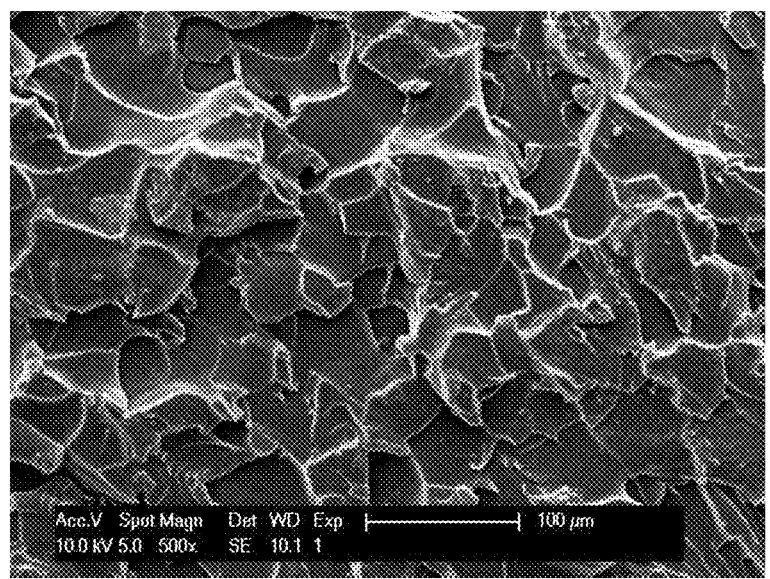

In FIG. 4, the fractured surfaces of the polymers according to the invention from Example 22 (FIG. 4a) and Example 23 (FIG. 4b) can be seen, which are substantially more ductile then the unregulated dimethacrylate network.

Examples 24 and 25, Comparison Examples 33 and 34

Molecular Weight Determination

Polymerizations were produced in the same way as in Examples 1 and 2 and comparison examples 1 and 2 with BMA without regulator (comparison example 33) and with 22 wt.-% of compound 1 (Example 24), 28 wt.-% of compound 2 (Example 25) and 28 wt.-% of compound 4 (comparison example 34), dissolved in THF and analysed with a Waters GPC with three series-connected columns (Styragel HR 0.5, Styragel HR 3 and Styragel HR 4) and a Waters 2410 RI detector in a column oven at 40° C. and at a flow rate of 1.0 ml/min using polystyrene standards, wherein the molecular weight (in kDa) and the polydispersity index (PDI) were determined. The results are given in Table 11.

TABLE 11

Molecular weight determination

| Example | Regulator | Mn [kDa] | PDI [ ] |
|---|---|---|---|
| C33 | — | 7.0 | 2.2 |
| E24 | 1 | 1.4 | 1.3 |
| E25 | 2 | 1.1 | 1.3 |
| C34 | 4 | 1.3 | 1.3 |

The values obtained, which correlate well with those of Table 1, show that the polymerization with addition of the three regulators led to significantly shorter chains than in the unregulated reaction. Furthermore, as expected, the molecular weight distribution also proved to be considerably more uniform after adding regulator. Compound 2 was again confirmed as the most effective of the three regulators tested.

Examples 26 to 30

Exemplary Reaction Mixtures for the Production of Polymers of the Invention

The present invention of the use of regulators of Formula 1 and/or 2 is suitable for the production of the most diverse polymers, as already discussed above. General instructions for the production of formulations for specific applications follow below.

Example 26

Formulation for Coating Surfaces Such as Wood (Topcoat)

| Component | Type | Quantity (parts by weight) |
|---|---|---|
| Monomers | Epoxy acrylate, e.g. Laromer LR 8986 | 55 |
| Reactive diluent | Low molecular weight di- or tri-acrylates; e.g. tripropylene glycol diacrylate | 26.5 |
| Regulator | Formula 1 or 2, n = 2, e.g. compound 3 | 10 |
| Initiator | Photoinitiator, e.g. Irgacure 500; amine synergist: Laromer LR 8956 | 3<br>2 |
| Solvent | None | — |
| Additives | Matting agent: e.g. talcum 10MOOS; wax: Ceraflour 950; defoamer: Tego Airex 920 | 10<br>3<br>0.5 |

Through the use of epoxy acrylates, a particularly hard-wearing surface is achieved, which is advantageous especially in the coating of metal surfaces. This effect can be further reinforced by including regulators such as e.g. compound 3. The presence of the reactive diluent acting as a comonomer additionally causes a reduction in processing viscosity and an improvement in mechanical properties.

Example 27

Formulation for 3D Printing

| Component | Type | Quantity (parts by weight) |
|---|---|---|
| Monomer | Dimethacrylates, e.g. polyester urethane dimethacrylate Bomar XR 741 | 100 |
| Regulator | Compound 6 | 12 |
| Initiator | Photoinitiator, such as a bisacyl-germanium compound, e.g. Ivocerin | 1 |
| Additives | UV absorber, e.g. Sudan Yellow | 0.2 |

Through the use of urethane methacrylates, particularly good storage stability is achieved. The long-wave absorption of the photoinitiator is adapted to the emission spectrum of the 3D printer. The UV absorber prevents scattered light and controls the layer thickness of the curing. Through the use according to the invention of the regulator, the impact resistance of the material can be improved significantly.

Example 28

Formulation for Casting Resins

| Component | Type | Quantity (parts by weight) |
|---|---|---|
| Monomers | Methacrylates, e.g. methyl methacrylate | 75 |
| Regulator | Formula 1 or 2, n = 1, e.g. compound 2 | 20 |
| Fillers | Polymethyl methacrylate (MW $4.76 \times 10^6$) | 4 |
| Initiator | Thermal initiator, e.g. AIBN | 1 |
| Additives | Mould release agent: stearic acid | 0.005 |

Through the use of methacrylates, particularly light-stable, thermally curable casting compounds are obtained. The use of relatively large quantities of the regulator shifts the gel point towards high conversions, as a result of which the internal stresses in the material can be reduced considerably.

Example 29

Formulation for the Production of Biomaterials Using Bone Cement

| Component | Type | Quantity (parts by weight) |
|---|---|---|
| Monomer | Divinyl ester, e.g. glucidol divinyl adipate | 100 |
| Regulator | Formula 1 or 2, n = 1; E.g. compound 1 | 15 |
| Initiator | Thermal initiator, e.g. dibenzoyl peroxide and ethyl dimethylaminobenzoate | 1<br>0.5 |
| Additives | Fillers, e.g. tricalcium phosphate | 20 |

Through the use of the sugar-based vinyl ester, particularly good biocompatibility is achieved. The degradation products (glucidol, adipic acid and oligovinyl alcohol) have excellent biocompatibility. The filler tricalcium phosphate brings about improved cell adhesion and remodelling. By means of the redox initiator system, a two-component injection paste can be produced which cures within 30 to 60 min and gives mechanical properties similar to those of bone. Through the use according to the invention of the regulator, the brittleness can be reduced by up to a factor of 10.

Example 30

Formulation for the Production of Hydrogels for Tissue Regeneration

| Component | Type | Quantity (parts by weight) |
| --- | --- | --- |
| Monomer | Divinyl ester, e.g. polyethylene glycol divinyl adipate | 100 |
| Regulator | Formula 2, n = 2, X = —COO—, A = H, B = $C_6H_4$ | 10 |
| Initiator | Photoinitiator, e.g. Li-TPO (Li salt of commercially available Lucerin TPO-L (cf. Biomaterials 30(35), 6702-6707 (2009)) | 1 |
| Solvent | Aqueous; e.g. PPS buffer | 400 |

The use of polyethylene glycol in the base monomer brings about good water solubility and, through the vinyl ester as reactive group, particularly high biocompatibility is achieved. The free carboxyl groups of the regulator also provide good solubility in the PBS buffer (phosphate-buffered sodium chloride solution) for this reagent. Formulations of this type are particularly suitable for forming hydrogel networks in the presence of tissue or living cells. Through the use according to the invention of the regulator, the brittleness of such hydrogels can be reduced significantly.

Example 31

Formulation for the Production of Printing Ink for Inkjet Printing

| Component | Type | Quantity (parts by weight) |
| --- | --- | --- |
| Monomer | Di- and triacrylates, e.g. hexanediol diacrylate and | 59 |
| | propoxylated trimethylolpropane triacrylate (SR 492, Sartomer) | 10 |
| Regulator | Formula 1, n = 2: e.g. compound 5 | 15 |
| Initiator | Photoinitiator, e.g. Lucerin TPO-L | 3 |
| Additives | Pigment: e.g. C.I. Pigment Violet 19; | 10 |
| | dispersant: Disperbyk 162; | 15 |
| | inhibitor: BHT | 0.1 |

Through the use of multifunctional acrylates, high reactivity is guaranteed. Low-molecular-weight compounds guarantee low viscosity. Initiator and pigment are matched in terms of their absorption behaviour. Through the addition according to the invention of the regulator, the brittleness of the printing ink can be reduced without decreasing the reactivity.

Example 32

Formulation for the production of stamps for nanoimprint lithography

| Component | Type | Quantity (parts by weight) |
| --- | --- | --- |
| Monomer | Oligomeric urethane acrylates and reactive diluents, e.g. aromatic urethane diacrylate (CN 976, Sartomer) and | 35 |
| | propoxylated trimethylolpropane triacrylate (SR 492, Sartomer) | 10 |
| Regulator | Formula 2, n = 2: e.g. compound 6 | 10 |
| Initiator | Photoinitiator, e.g. Irgacure 819 | 3 |
| Additives | Inhibitor: BHT | 0.1 |

The use of multifunctional acrylates and aromatic urethane diacrylate provides a good basis for tough, abrasion-resistant stamp materials. Through the addition according to the invention of the regulator, the brittleness and abrasion resistance of the stamp can be further improved significantly. In addition, considerably more accurate reproduction of surface detail can be achieved. This material is also suitable as an imprint material, to which end the proportions of the reactive diluent can be reduced e.g. to about 5 parts by weight.

Example 33

Formulation for the Production of Printing Inks for Transfer Printing and Screen Printing

| Component | Type | Quantity (parts by weight) |
| --- | --- | --- |
| Monomer | Oligomeric acrylates and diluents; e.g. Laromer LR 9013, | 5 |
| | Laromer UA 19T, | 54 |
| | Laromer LR 8986, | 7 |
| | dipropylene glycol diacrylate | 15 |
| Regulator | Formula 1, n = 2; e.g. compound 5 | 15 |
| Initiator | Photoinitiator; e.g. Lucerin TPO-L, | 1.5 |
| | Irgacure 369, | 1 |
| | Irgacure 907, | 0.5 |
| | Darocur 1173, | 2 |
| | coinitiator LR 8956 | 6 |
| Additives | Pigments; e.g. Heliogen Blue D 7092, | 5 |
| | Aerosil 200, | 2 |
| | CAB 551-001 (20% in DPGDA) | 1 |

Through the use of multifunctional acrylates, high reactivity is guaranteed. Initiator and pigment are matched in terms of their absorption behaviour. Through the addition according to the invention of the regulator, the brittleness of the printing ink can be reduced without decreasing its reactivity. Particularly in the case of textiles, this brings significantly higher resistance to chipping of the coating, especially when the textiles are cleaned.

Example 34

Formulation for the Production of a Lithographic Varnish

| Component | Type | Quantity (parts by weight) |
| --- | --- | --- |
| Monomer | Ebecryl 810, | 25 |
| | Ebecryl 150, | 30 |
| | tripropylene glycol diacrylate | 10 |
| Regulator | Formula 1, n = 2, e.g. compound 5 | 8 |

-continued

| Component | Type | Quantity (parts by weight) |
|---|---|---|
| Initiator | Photoinitiator, e.g. Lucerin TPO-L, | 4 |
| | Irgacure 369, | 4 |
| | Irgacure 907 | 2 |
| Additives | Pigment, e.g. Litho Rubin D 4574 DD, | 17 |
| | inhibitor: BHT | 0.1 |

Through the use of multifunctional acrylates, high reactivity is guaranteed. Initiator and pigment are matched in terms of their absorption behaviour. Through the addition according to the invention of the regulator, the brittleness and adhesion can be improved without decreasing the reactivity.

Example 35

Formulation for Offset Printing Inks

| Component | Type | Quantity (parts by weight) |
|---|---|---|
| Monomers | Oligomeric acrylates, e.g. Laromer LR 9013 | 18.5 |
| | Laromer LR 9004 | 40 |
| | Laromer LR 8986 | 15.7 |
| Regulator | Formula 2, n = 1, e.g. compound 2 | 8 |
| Initiator | Photoinitiator, e.g. Lucerin TPO-L | 3 |
| | Irgacure 369 | 3 |
| Additives | Pigment; e.g. Permanent Yellow GR 01 | 15.8 |

Through the use of the oligomeric acrylates, appropriate reactivities and mechanical properties are achieved. Initiator and pigment are matched in terms of their absorption behaviour. Through the addition according to the invention of the regulator, the brittleness of the printing ink can be reduced without decreasing the reactivity.

Example 36

Formulation for Scratch-resistant Coatings on Glass

| Component | Type | Quantity (parts by weight) |
|---|---|---|
| Monomers | Sartomer CN 965, | 10 |
| | dipentaerythritol pentaacrylate (SR 399), | 64.2 |
| | propoxylated neopentyl glycol di-acrylate (SR 9003) | 16.4 |
| Regulator | Formula 2, n = 2, e.g. compound 6 | 8 |
| Initiator | Photoinitiator, e.g. benzophenone | 7 |
| | Darocur 1173 | 2 |

Through the use of the named low-molecular-weight acrylates as monomers, appropriate reactivities and especially scratch resistance are achieved. Through the addition according to the invention of the regulator, the brittleness of the coating, and thus peeling, can be reduced without decreasing the reactivity.

Example 37

Formulation for Silicone Release Coatings

| Component | Type | Quantity (parts by weight) |
|---|---|---|
| Monomers | Silicone acrylates: e.g. TEGO RC 711 | 30 |
| | TEGO RC 902 | 70 |
| Regulator | Formula 2, n = 2, e.g. compound 6 | 5 |
| Initiator | Photoinitiator, e.g. TEGO A17 | 2 |

Through the use of the silicone acrylates, very good silicone release coatings can be produced. A disadvantage is the ageing behaviour, where the adhesive of the labels can react with unreacted acrylates and therefore poor release characteristics are obtained. Through the addition according to the invention of the regulator, the double bond conversion of the coating can be increased significantly without decreasing the reactivity.

Example 38

Formulation for Coating Metal Surfaces (e.g. Steel)

| Component | Type | Quantity (parts by weight) |
|---|---|---|
| Monomers | Polyether urethane diacrylate, e.g. Bomar BR 344 | 50 |
| Reactive diluent | Low-molecular-weight di- or tri-acrylates: e.g. dipropylene glycol diacrylate | 50 |
| Regulator | Formula 1 or 2, n = 2, e.g. compound 3 | 10 |
| Initiator | Photoinitiator, e.g. isopropyl thioxanthone, methyldiethanolamine | 1 |
| Additives | Pigments, e.g. titanium dioxide | 15 |

Through the use of urethane acrylates, particularly good adhesion is achieved, which is advantageous especially in the coating of metal surfaces. This effect can be further reinforced by including regulators such as e.g. compound 3. The presence of the reactive diluent acting as a comonomer additionally brings about a reduction in processing viscosity and an improvement in mechanical properties.

The invention claimed is:

1. Polymerizable composition comprising a regulator for polymerization reactions of radically polymerizable, ethylenically unsaturated monomers which is selected from sulfonic acid esters of the following Formula 1 and/or Formula 2, individually or as a mixture of more than one thereof:

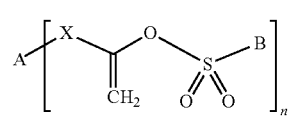

Formula 1

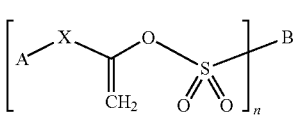

Formula 2 wherein
- A in each case independently is selected from H, CN, linear, branched or cyclic aliphatic or aromatic $C_1$-$C_{30}$ hydrocarbon residues, which are optionally substituted with one or more substituents, wherein the aliphatic hydrocarbon residues are optionally interrupted by one or more urethane groups, ester groups, O and/or S;
- X in each case independently is —COO— or —CON($R^1$)—, wherein the binding to A occurs via O or N, or is absent if A is an aromatic hydrocarbon residue or CN;
- B in each case independently is selected from linear, branched or cyclic aliphatic or aromatic $C_1$-$C_{30}$ hydrocarbon residues, which are optionally substituted with one or more substituents, wherein the aliphatic hydrocarbon residues are optionally interrupted by one or more urethane groups, ester groups, O and/or S;
- $R^1$ in each case independently is selected from hydrogen and linear, branched or cyclic aliphatic or aromatic $C_1$-$C_{10}$ hydrocarbon residues, which are optionally substituted with one or more OH groups, wherein the aliphatic hydrocarbon residues are optionally interrupted by one or more oxygen atoms; and
- n in each case independently is an integer from 1 to 6, and 60 to 98 wt.-% of at least one ethylenically unsaturated monomer, based on the total weight of the monomers and regulators.

2. A polymerizable composition according to claim 1, characterized in that the molar ratio between the ethylenic unsaturations in the radically polymerizable monomers and the sulfonate groupings in the sulfonic acid esters of Formulae 1 and 2 is at least 3:1.

3. A polymerizable composition according to claim 1, characterized in that the ethylenically unsaturated monomers are selected from (meth)acrylates, vinyl esters and mixtures thereof.

4. A polymerizable composition according to claim 3, characterized in that the ethylenically unsaturated monomers are selected from multifunctional (meth)acrylates and vinyl esters.

5. A polymerizable composition according to claim 1, characterized in that the polymerizable composition comprises at least one radical polymerization initiator and optionally at least one solvent.

6. A polymerizable composition according to claim 1, characterized in that A is selected from hydrocarbon residues with 1 to 20 carbon atoms.

7. A polymerizable composition according to claim 1, characterized in that A comprises an aliphatic hydrocarbon residue, which is optionally interrupted by 1 to 4 urethane groups, ester groups or oxygen atoms, and is optionally substituted with 1 to 4 OH groups.

8. A polymerizable composition according to claim 1, characterized in that A and/or B comprise at least one phenyl, phenylene, naphthyl or naphthylene residue, which are in each case optionally substituted with 1 to 3 substituents selected from OH, $CH_3$ and $OCH_3$.

9. A polymerizable composition according to claim 1, characterized in that $R^1$ is an aliphatic $C_{1-6}$ hydrocarbon residue, which is optionally interrupted by 1 to 2 oxygen atoms and optionally substituted with 1 to 2 OH groups.

10. A polymerizable composition according to claim 1, characterized in that either
   i) X is —COO—, in which case the binding to A occurs via O, or
   ii) X is absent, wherein A is an aromatic hydrocarbon residue with 6 carbon atoms, which is optionally substituted with 1 to 3 substituents selected from —$CH_3$, —OH and —$OCH_3$.

11. A polymerizable composition according to claim 1, characterized in that n=2 to 4.

12. A polymerizable composition according to claim 1, characterized in that
   a) A for n=1 is selected from optionally branched $C_{1-10}$ alkyl, optionally interrupted by oxygen atoms, and phenyl, which for n>1 can be substituted with further vinylsulfonate or sulfonyloxyacryloyloxy or sulfonyloxyacrylamido groupings; and/or
   b) B for n=1 is selected from OH, $C_{1-10}$ alkyl, phenyl and naphthyl, which are optionally substituted with OH, $C_{1-6}$ alkyl or alkoxy, benzyl or phenoxy, and for n>1 can be substituted with further vinyloxysulfonyl groupings; and/or
   c) $R^1$ is selected from $C_{1-10}$ alkyl.

13. A polymerizable composition according to claim 1, characterized in that the sulfonic acid ester or esters of Formula 1 and/or Formula 2 is/are selected from:

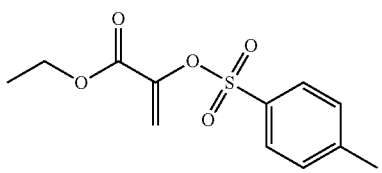 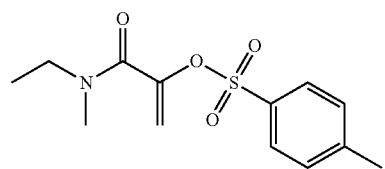 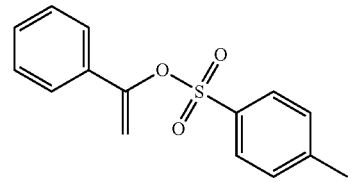

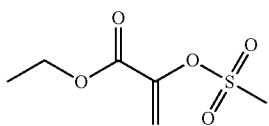 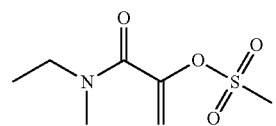 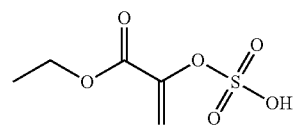

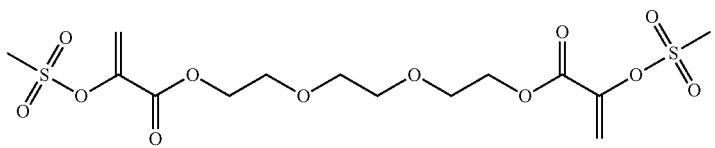

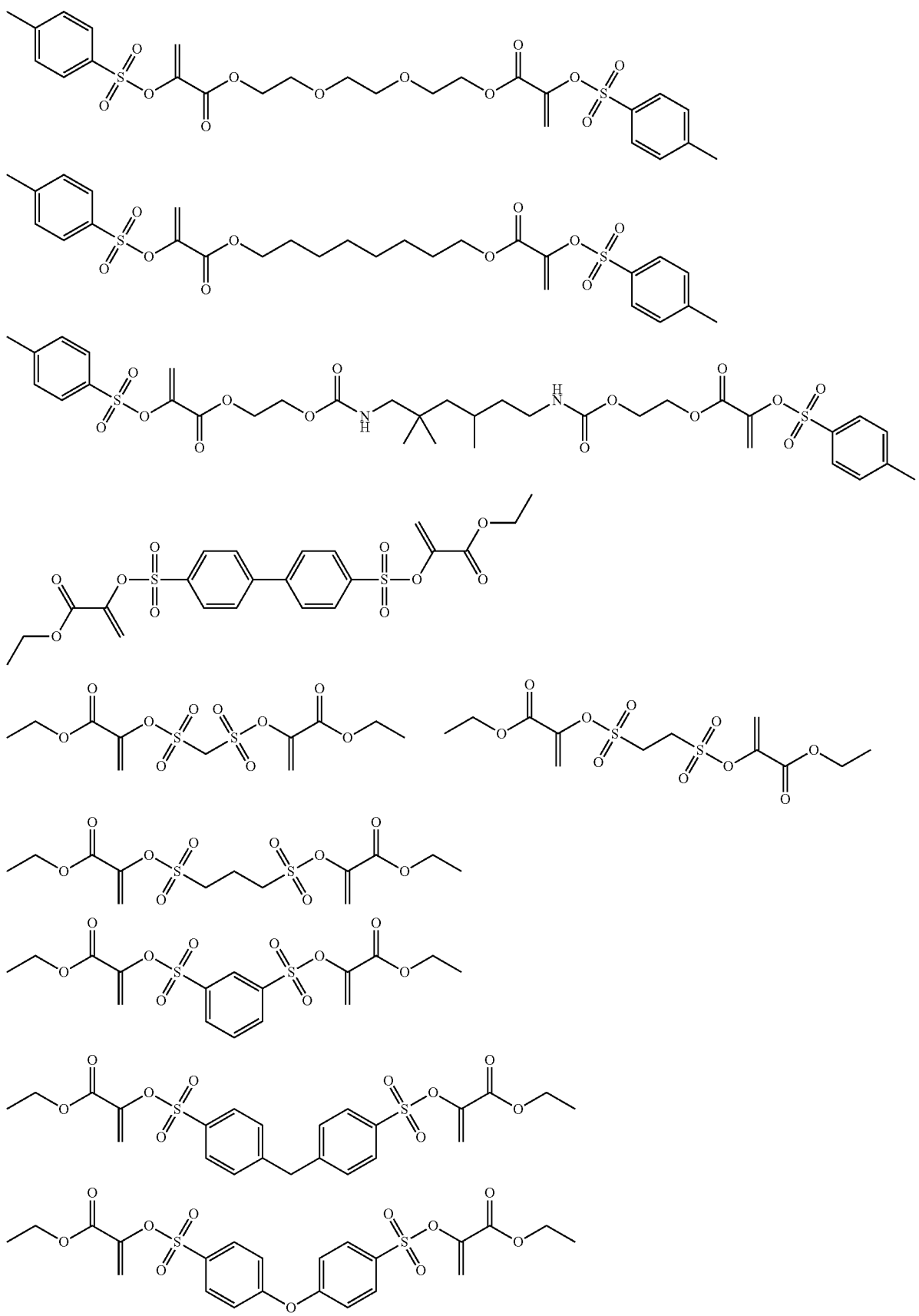

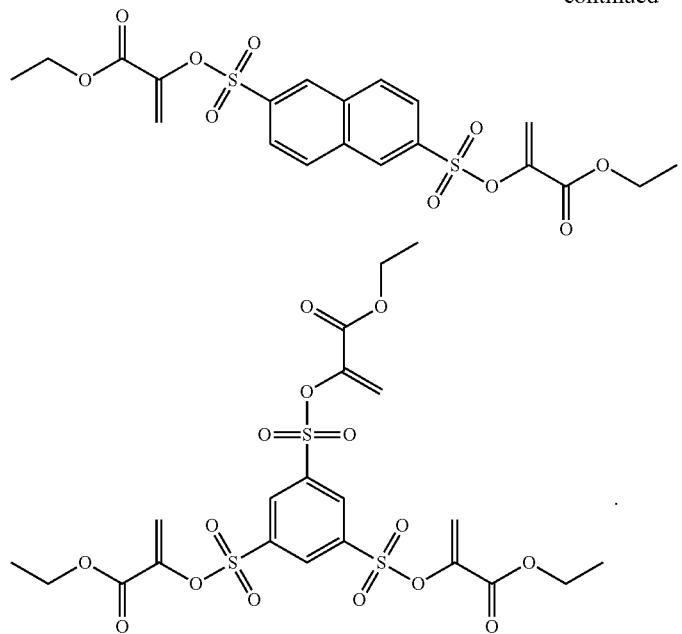

14. Polymer, obtained by radical polymerization of a composition as defined in claim 1.

15. Polymer according to claim 14, characterized in that the radical polymerization was carried out with ethylenically unsaturated monomers selected from multifunctional (meth) acrylates and vinyl esters and the polymer is a cross-linked polymer.

16. Polymer according to claim 14 for use as a varnish, coating or adhesive or for the production of shaped bodies by casting or 3D printing.

17. A regulator according to claim 1, characterized in that the molar ratio between the ethylenic unsaturations in the radically polymerizable monomers and the sulfonate groupings in the sulfonic acid esters of Formulae 1 and 2 is at least 5:1.

18. A regulator according to claim 1, characterized in that A is selected from hydrocarbon residues with 1 to 12, carbon atoms.

19. A regulator according to claim 1, characterized in that A and/or B comprise 1 to 4 phenyl or phenylene residues, which are in each case optionally substituted with 1 to 3 substituents selected from OH, CH3 and OCH3.

20. A regulator according to claim 1, characterized in that a) 60 to 98 wt.-% of the ethylenically unsaturated monomers, based on the total weight of the monomers and regulators, are used; and/or b) 0.1 to 3 wt.-%, of at least one radical polymerization initiator is used; and/or c) at least one solvent, selected from water, dimethyl sulfoxide, ethanol, dimethyl¬formamide, polyethylene glycol and mixtures thereof is used.

21. A regulator according to claim 1, characterized in that a) 70 to 95 wt.-%, of the ethylenically unsaturated monomers, based on the total weight of the monomers and regulators, are used; and/or b) 0.1 to 3 wt.-%, of at least one radical polymerization initiator is used; and/or c) at least one solvent, selected from water, dimethyl sulfoxide, ethanol, dimethyl¬formamide, polyethylene glycol and mixtures thereof is used.

* * * * *